US012807857B2

(12) United States Patent
Domingues Dos Santos et al.

(10) Patent No.: US 12,807,857 B2
(45) Date of Patent: Nov. 24, 2026

(54) ELECTROCALORIC POLYMER, INK AND FILM COMPRISING SAME, AND USES THEREOF

(71) Applicants: Arkema France, Colombes (FR); UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

(72) Inventors: Fabrice Domingues Dos Santos, Colombes Cedex (FR); Thibaut Soulestin, Pierre-Benite Cedex (FR); Florian Le Goupil, Pessac Cedex (FR); Konstantinos Kallitsis, Pessac Cedex (FR); Georges Hadziioannou, Pessac Cedex (FR)

(73) Assignee: ARKEMA FRANCE, Puteaux (FR)

( * ) Notice: Subject to any disclaimer, the term of this patent is extended or adjusted under 35 U.S.C. 154(b) by 1176 days.

(21) Appl. No.: 17/784,438

(22) PCT Filed: Dec. 11, 2020

(86) PCT No.: PCT/FR2020/052388
§ 371 (c)(1),
(2) Date: Jun. 10, 2022

(87) PCT Pub. No.: WO2021/116618
PCT Pub. Date: Jun. 17, 2021

(65) Prior Publication Data

US 2023/0022870 A1 Jan. 26, 2023

(30) Foreign Application Priority Data

Dec. 13, 2019 (FR) ...................................... 1914421
Jun. 26, 2020 (FR) ...................................... 2006705

(51) Int. Cl.
*C09K 5/14* (2006.01)

(52) U.S. Cl.
CPC .................................... *C09K 5/14* (2013.01)

(58) Field of Classification Search
CPC . C09K 5/14; C08L 27/12; C08L 27/22; C08L 27/24; C08L 27/16; C09D 127/17; C09D 127/22; C09D 127/24; C09D 127/16
See application file for complete search history.

(56) References Cited

U.S. PATENT DOCUMENTS

| | | | |
|---|---|---|---|
| 4,904,739 A | 2/1990 | Sandler | |
| 10,189,926 B2* | 1/2019 | Domingues Dos Santos .............. | C08F 214/182 |
| 2017/0298161 A1* | 10/2017 | Domingues Dos Santos .............. | C08F 2/001 |
| 2020/0157334 A1 | 5/2020 | Hadziioannou et al. | |
| 2020/0157365 A1 | 5/2020 | Lannuzel et al. | |
| 2021/0032384 A1 | 2/2021 | Balema et al. | |

FOREIGN PATENT DOCUMENTS

| | | |
|---|---|---|
| WO | 2019016454 A1 | 1/2019 |
| WO | 2019020906 A1 | 1/2019 |
| WO | 2019075061 A1 | 4/2019 |

OTHER PUBLICATIONS

International Search Report (PCT/ISA/210) with translation and Written Opinion (PCT/ISA/237) mailed on Apr. 8, 2021, by the European Patent Office as the International Searching Authority for International Application No. PCT/FR2020/052388. (12 pages).
Li et al., "Tunable temperature dependence of electrocaloric effect in ferroelectric relaxor poly(vinylidene fluoride-trifluoroethylene-chlorofluoroethylene terpolymer", Applied Physics Letters, 2011, vol. 99, No. 5, pp. 052907-1_052907-3.
Lu et al., "Comparison of directly and indirectly measured electrocaloric effect in relaxor ferroelectric polymers", Applied Physics Letters, 2010, vol. 97, No. 20, pp. 202901-1_202901-3.
Neese et al., "Large electrocaloric effect in ferroelectric polymers near room temperature", Science, 2008, vol. 321, No. 5890, pp. 821-823.
Shi et al., "Electrocaloric cooling materials and devices for zero-global-warming-potential, high-efficiency refrigeration", Joule 3, 2019, Elsevier Inc, pp. 1-26.
Soulesttn et al. "Vinylideoe fluoride- aod trifluoroethyleoe-containiog fluorinated electroactive copolymers. How does chemistry impact properties?" Progress in Polymer Science, vol. 72, May 15, 2017, pp. 16-60, XP085152382.
Wang et al. "High dielectric VDF/TrFE/CTFE terpolymers prepared by hydrogenation of VDF/CTFE copolymers: synthesis and characterization" Macromolecules, 2006, vol. 39, No. 13, pp. 4268-4271.
Zhang et al., "Ferroelectric Polymer Nanocomposites with Complementary Nanostructured Fillers for Electrocaloric Cooling with High Power Density and Great Efficiency" ACS Applied Energy Materials, 2018, 1(3), pp. 1344-1354.

* cited by examiner

*Primary Examiner* — Jane L Stanley
(74) *Attorney, Agent, or Firm* — Boone IP Law

(57) ABSTRACT

A polymer including VDF-based units having an electrocaloric effect under the effect of a variable electric field. The polymer includes 0.1 to 10.0 mol % double bonds, which are substantially non-conjugated. Also, a corresponding composition including the polymer, a corresponding film including the polymer, and to various uses of the polymer.

23 Claims, 8 Drawing Sheets

[Fig. 1]
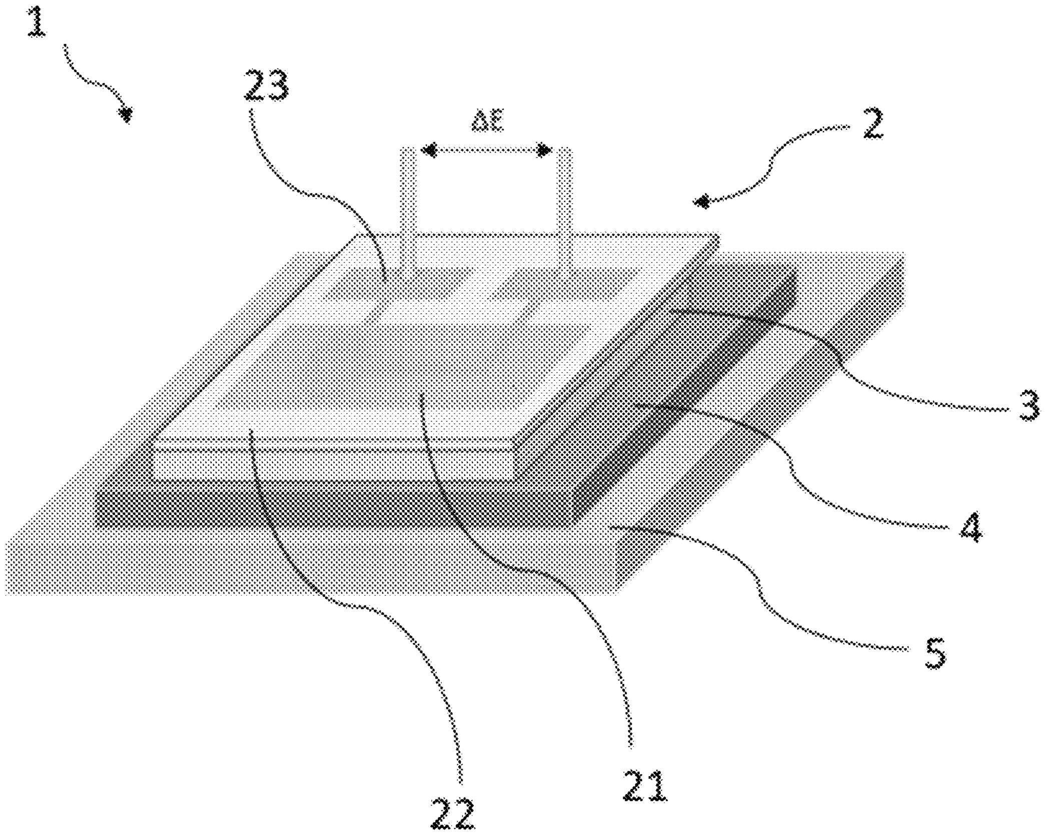
[Fig. 2]
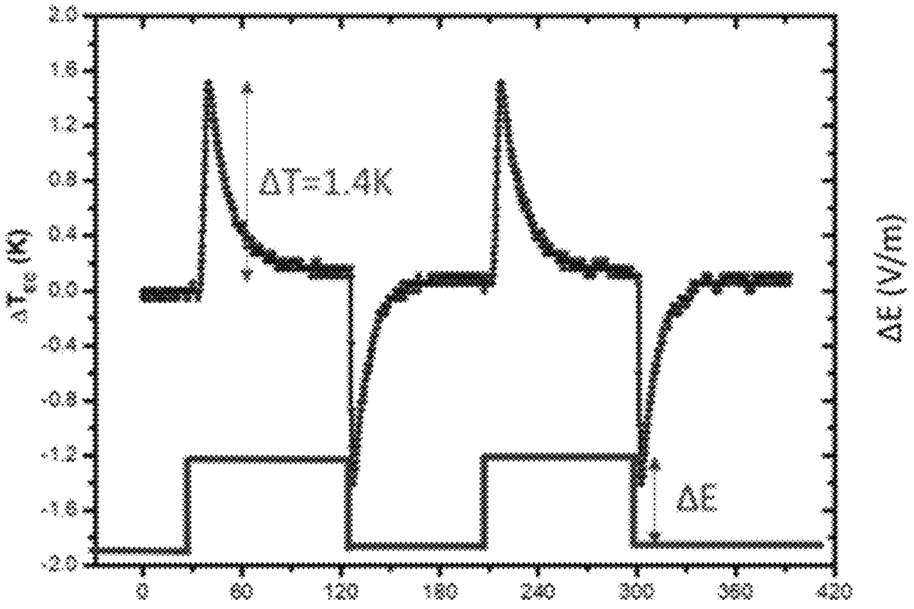

[Fig. 3]
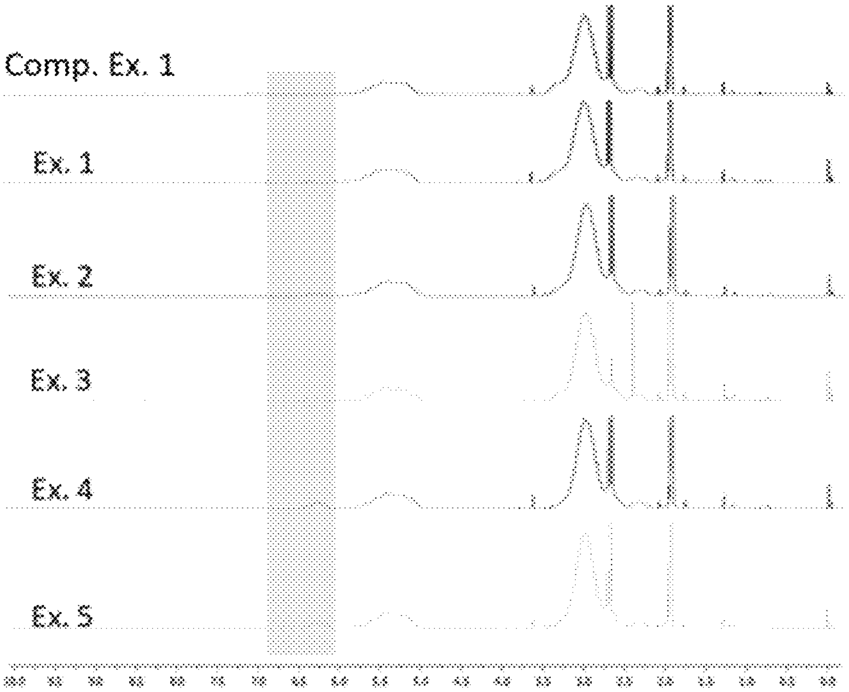
[Fig. 4]
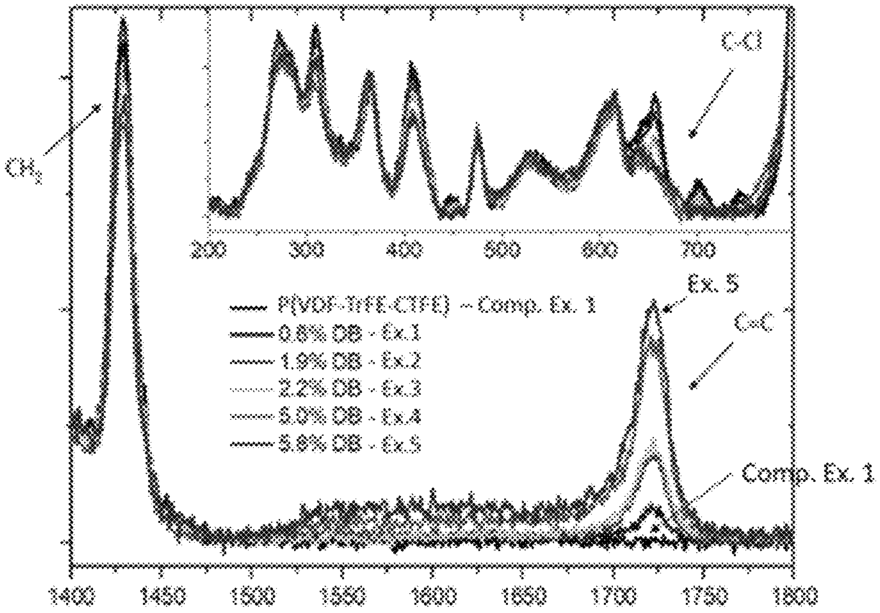

[Fig. 5]
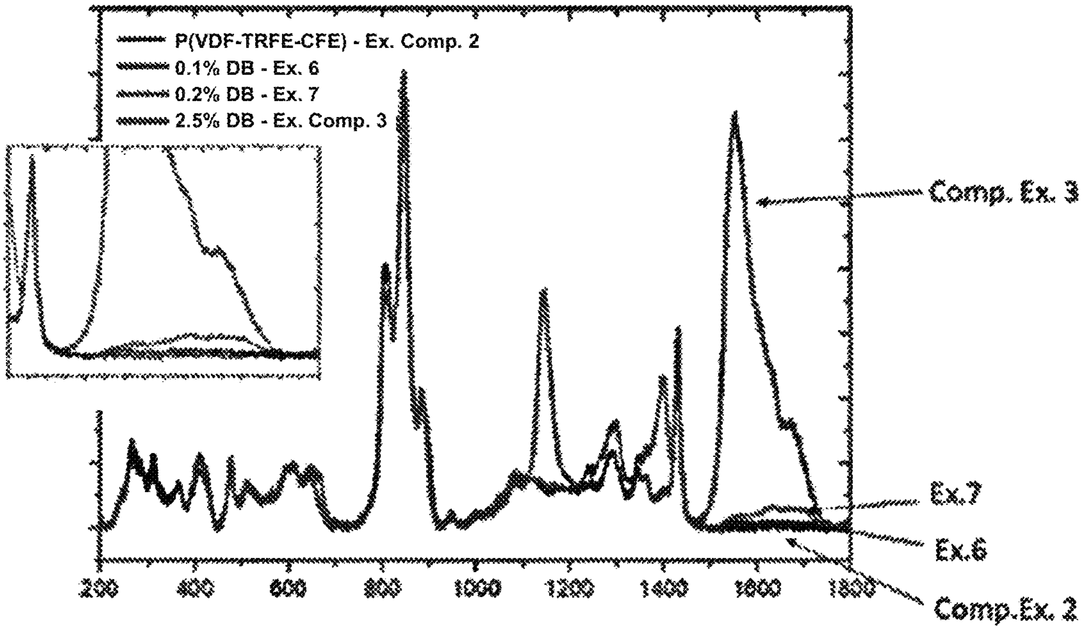
[Fig. 6A]
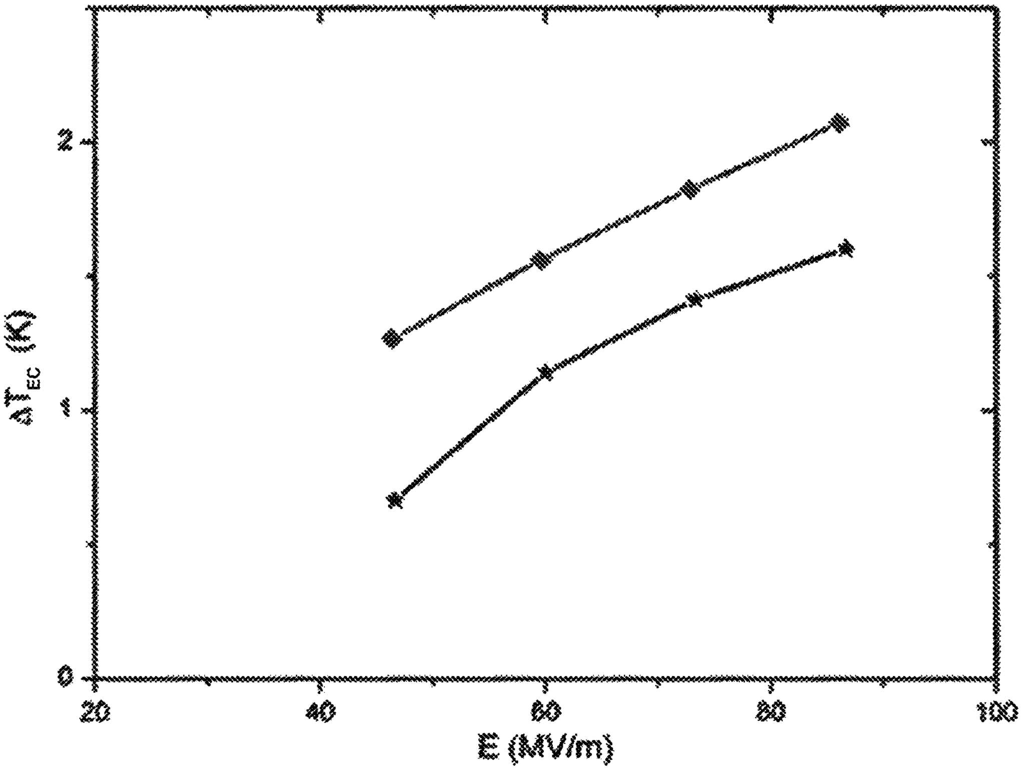

[Fig. 6B]
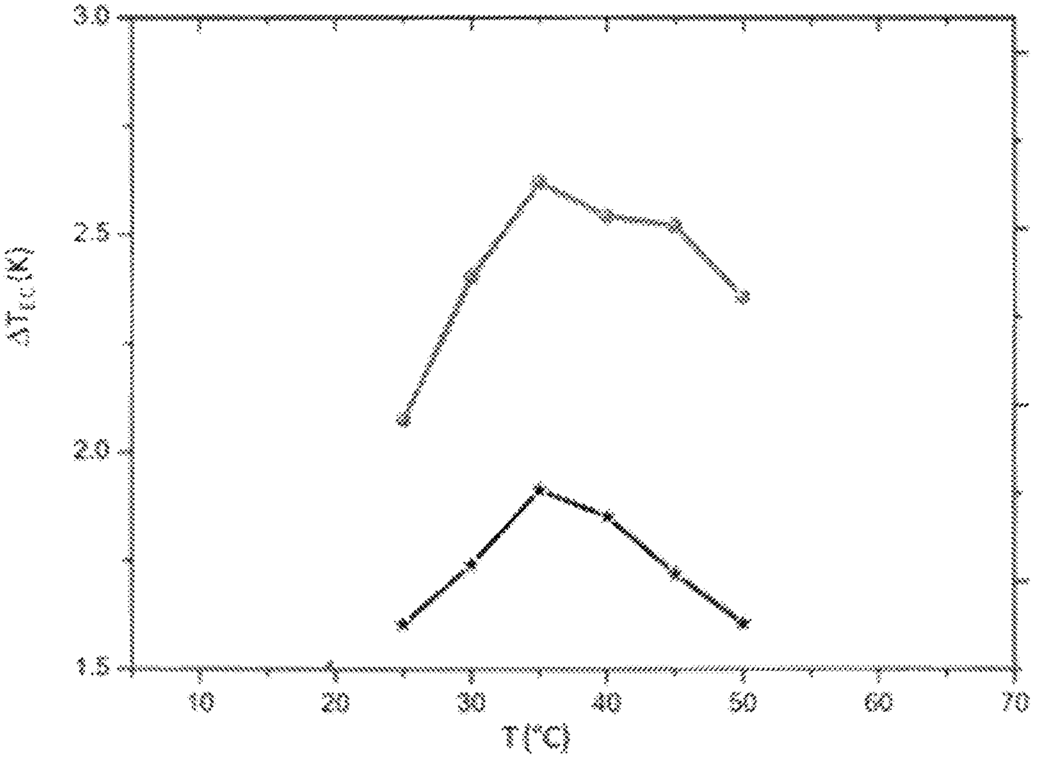
[Fig. 7A]
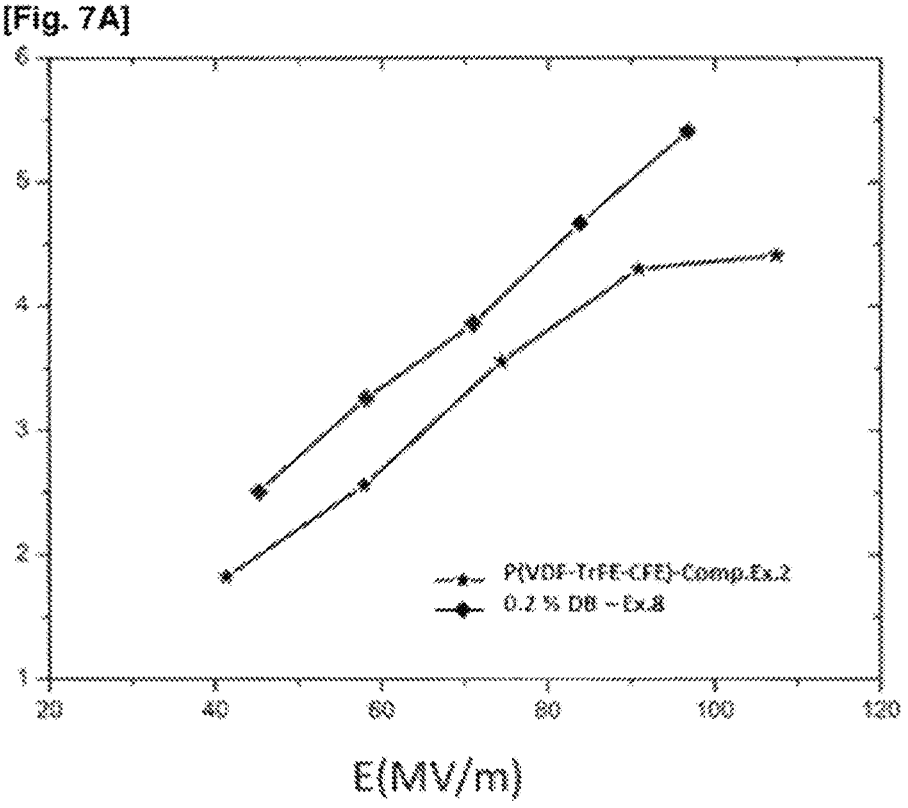

[Fig. 7B]
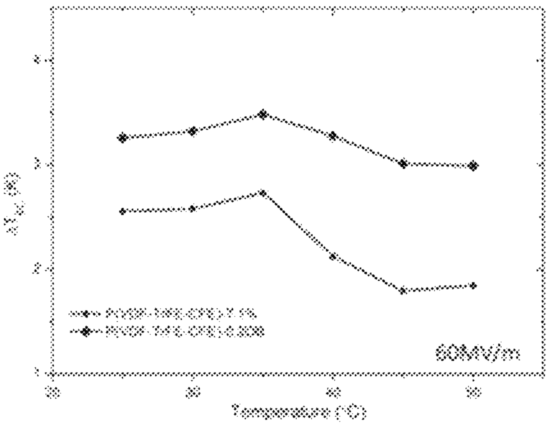
[Fig. 7C]
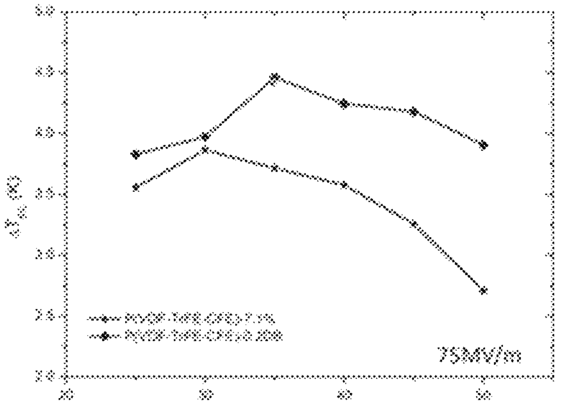

[Fig. 8]
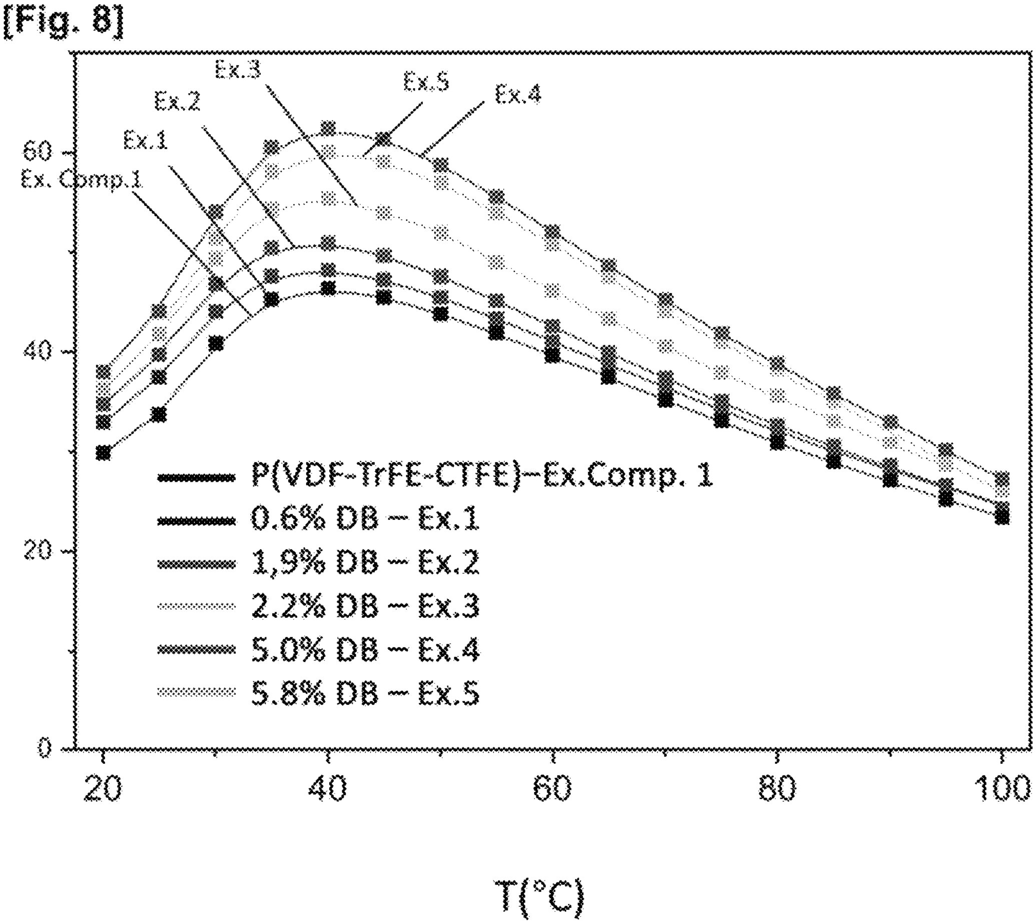
[Fig. 9]
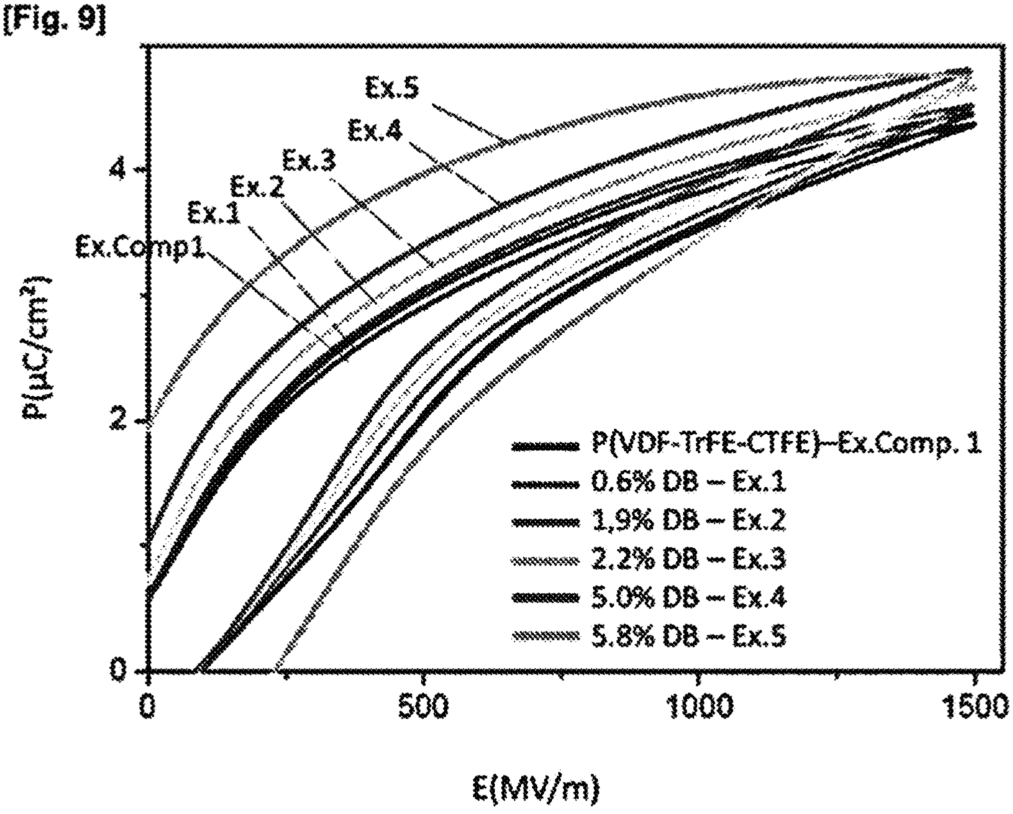

[Fig. 10]
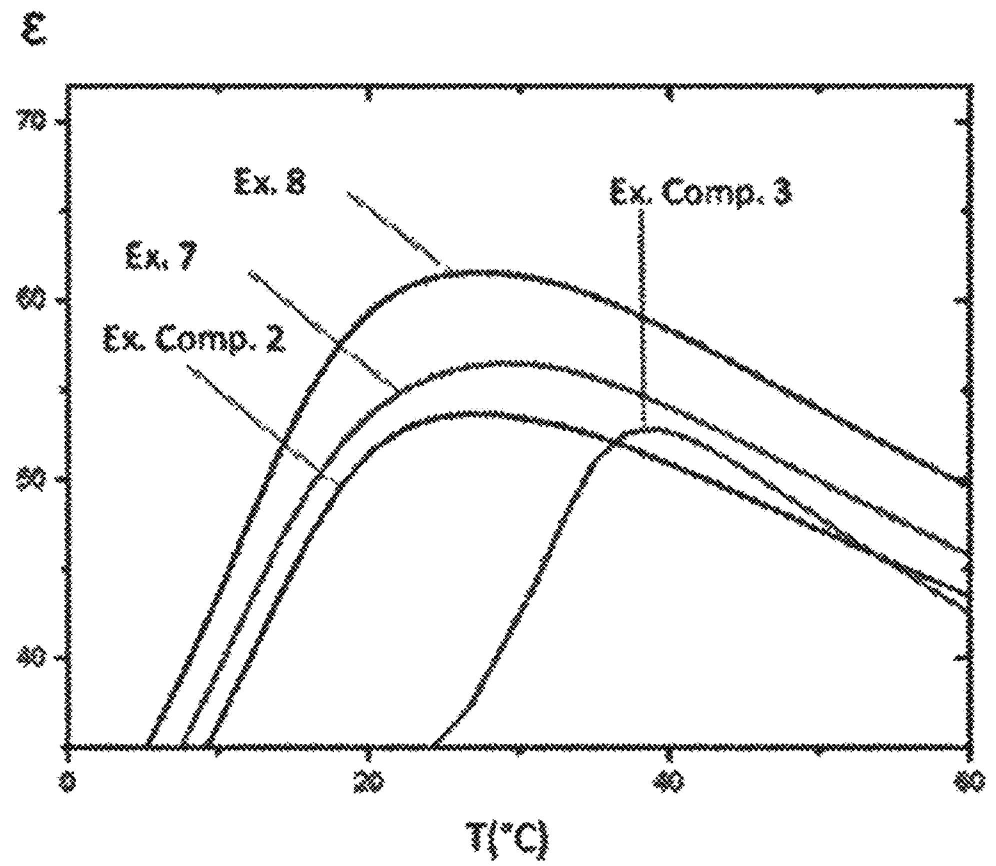
[Fig. 11]
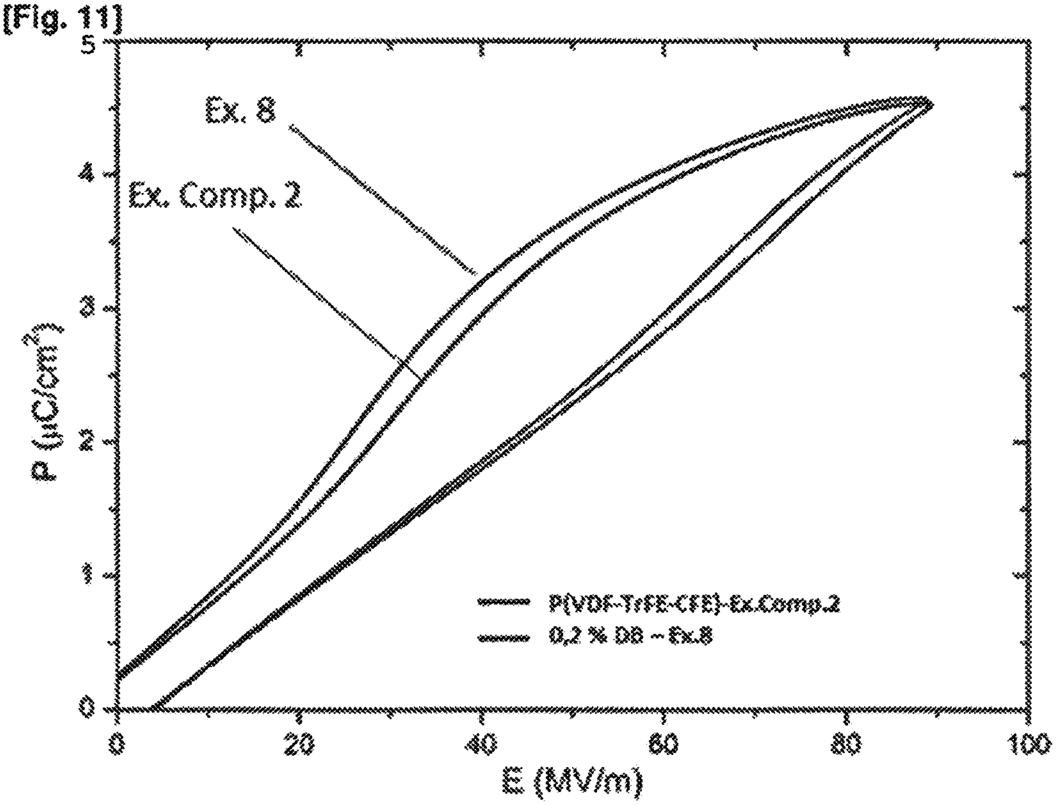

[Fig. 12]
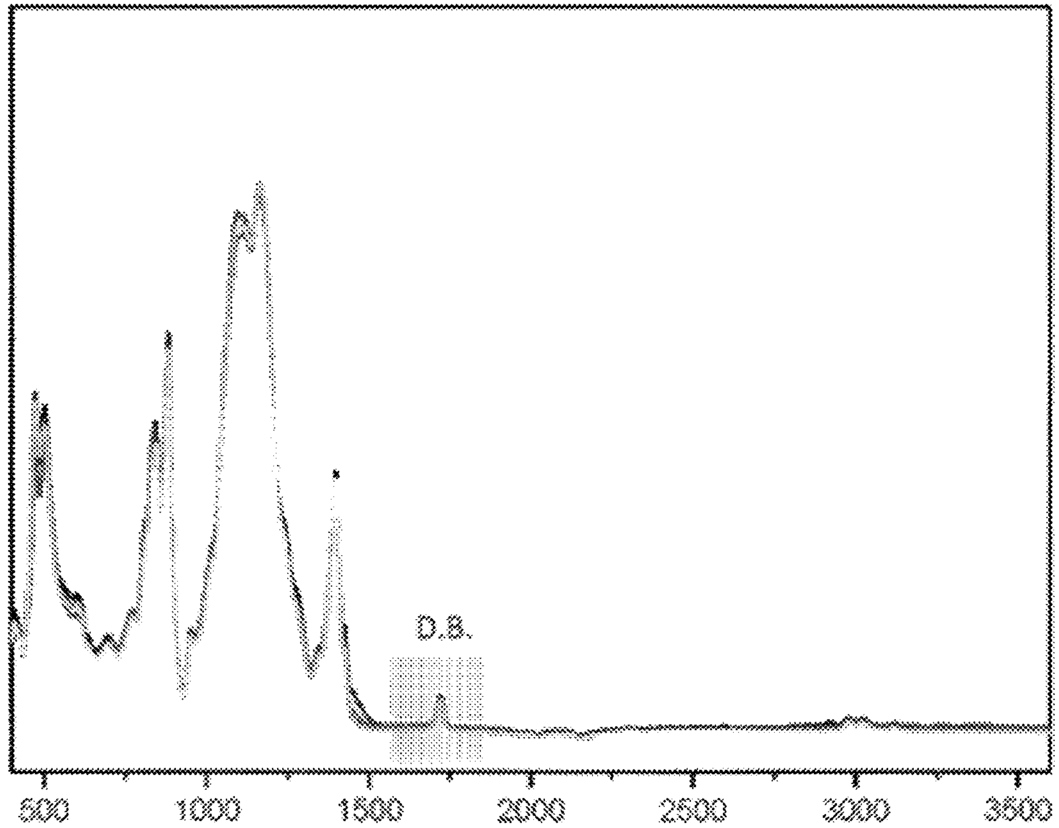

ELECTROCALORIC POLYMER, INK AND FILM COMPRISING SAME, AND USES THEREOF

TECHNICAL FIELD

The invention relates to the field of electrocaloric materials.

More particularly, the invention relates to an electroactive polymer exhibiting a significant electrocaloric effect, that is to say a significant variation in adiabatic temperature, when the polymer is subjected to a variable electric field.

The invention also relates to an ink and a film based on the electroactive polymer.

The invention finally relates to various possible uses of the polymer, in particular in the form of a film.

PRIOR ART

The electrocaloric effect is a property of certain dipolar dielectric materials which manifests itself by a variation in temperature when they are subjected to a variable electric field. The physical origin of this phenomenon is related to the change in the dipolar order, and therefore to a variation in the dipolar entropy induced by the application of an electric field. The application of an electric field $E_c$ orders and orients the dipoles of these materials, which brings about a decrease in their dipolar entropy and an increase in their temperature under adiabatic conditions. Conversely, the reduction or suppression of the electric field brings about an increase in their dipolar entropy and a reduction in their temperature under adiabatic conditions. Thus, an electrocaloric material is characterized, under given experimental conditions, by a variation in adiabatic temperature $\Delta T_{EC}$ for an applied electric field $E_c$ under adiabatic conditions. Alternatively, an electrocaloric material can also be characterized by a change in isothermal entropy $\Delta\delta_{EC}$ for an applied electric field $E_c$ under isothermal conditions.

The electrocaloric effect is currently the subject of numerous studies for the development of new cooling systems, more environmentally friendly and more energy efficient than systems operating on the basis of gas compression, of the thermoelectric effect or of the magnetocaloric effect [see: SHI, Junye, H A N, Donglin, L I, Zichao, et al., Electrocaloric cooling materials and devices for zero-global-warming-potential, high-efficiency refrigeration. Joule, 2019]. Ferroelectric materials and relaxor ferroelectrics, due to strong coupling between the applied electric fields and their dipolar structure, are the materials which have aroused the greatest interest for these applications because they are likely to have high electrocaloric performance qualities. In particular, this coupling is at a maximum close to or slightly above the phase transitions: Ferroelectric→Paraelectric (FE →PE) or Relaxor Ferroelectric→Paraelectric (RFE→PE), due in particular to a strong reversible variation in the polarization of these materials under an electric field, as well as a high dielectric permittivity. In other words, close to the phase transitions FE→PE or RFE→PE, a relatively weak variation in electric field generates significant variations in entropy and in temperature. Good flexibility and ease of processing of these materials in the form of thin films with a large surface area are other parameters which make them particularly suitable for use in solid refrigeration systems.

Among "ferroelectric" and "relaxor ferroelectric" polymer materials, fluoropolymers based on VDF and on TrFE have been the most studied. They exhibit the best performance qualities to date.

The electrocaloric properties of ferroelectric copolymers of P(VDF-TrFE) type are at a maximum close to the Ferroelectric→Paraelectric (FE→PE) transition. The FE→PE transition of this type of polymer is narrow, that is to say that it takes place over a small range of temperatures, and is located at relatively high temperatures, typically strictly greater than 60° C. This prevents their use in cooling systems which have to operate in the vicinity of ambient temperature and/or over a wide range of temperatures.

The use of relaxor ferroelectric polymers makes it possible to overcome some at least of the abovementioned disadvantages. This is because relaxor ferroelectric polymers of the type: P(VDF-TrFE), which is irradiated, P(VDF-TrFE-CFE) or P(VDF-TrFE-CTFE), possess an (RFE→PE) phase transition which is enlarged in comparison with the FE→PE phase transition of ferroelectric polymers, that is to say which takes place over a wider range of temperatures. Moreover, the RFE→PE transition is located at generally lower temperatures than those of the FE→PE transition of ferroelectric polymers. Thus, this makes it possible to envisage use of relaxor ferroelectric polymers in varied cooling systems, in particular in cooling systems which have to operate in the vicinity of ambient temperature and/or over a wide range of temperatures.

The electrocaloric performance qualities of a material can be estimated theoretically (indirect method) from its dielectric properties, using an equation obtained from Maxwell's relations:

$$\Delta T_{EC} = -\int_{E1}^{E2} \frac{T(E)}{C_E}\left(\frac{\delta P}{\delta T}\right)_E dE,$$

in which:

$\Delta T_{EC}$ denotes the variation in adiabatic temperature of the material,

T denotes the temperature of the material, $C_E$ denotes the heat capacity of the material, P denotes the dielectric polarization of the material, and E denotes the electric field varying between a minimum value $E_1$ and a maximum value $E_2$.

Neese et al. were, for example, able to estimate, by an "indirect" method, that ferroelectric copolymers of P(VDF-TrFE) type, composed of 55 mol % of VDF and 45 mol % of TrFE, having a Curie temperature (FE→PE transition) of approximately 70° C., can bring about variations in adiabatic temperature ($\Delta T_{EC}$) from 12° C. to approximately 80° C. for a high electric field of 209 V/μm. Neese et al. were also able to estimate that P(VDF-TrFE-CFE) terpolymers with a composition of 59.2/33.6/7.2 mol %, having a dielectric constant peak between 20° C. and 40° C. for frequencies ranging from 1 kHz to 100 kHz, can bring about variations in adiabatic temperatures ($\Delta T_{EC}$) of the order of 12° C. to approximately 55° C. for a high electric field of 307 V/μm [see: NEESE, Bret, C H U, Baojin, L U, Sheng-Guo, et al., Large electrocaloric effect in ferroelectric polymers near room temperature. Science, 2008, Vol. 321, No. 5890, pp. 821-823].

The reliability of the indirect methods for estimating $\Delta T_{EC}$ are, however, currently being called into question for certain materials, and in particular for fluoropolymers [see LU, S. G., ROŽIČ, B., ZHANG, Q. M., et al., Comparison of directly and indirectly measured electrocaloric effect in relaxor ferroelectric polymers. Applied Physics Letters, 2010, Vol. 97, No. 20, p. 202901]

Other measurement methods, known as "direct", have been developed in order to be able to compare the performance qualities of materials with one another and to thus overcome, at least in part, the abovementioned disadvantages of the indirect methods [see: LU, S. G., ROŽIČ, B., ZHANG, Q. M., et al., Comparison of directly and indirectly measured electrocaloric effect in relaxor ferroelectric polymers. Applied Physics Letters, 2010, Vol. 97, No. 20, p. 202901].

Li et al. have, for example, been able to measure, directly, that P(VDF-TrFE-CFE) relaxor terpolymers with a composition of 59.2/33.6/7.2 mol % could show significant electrocaloric effects in an enlarged range of temperatures, of the order of 40° C. A variation in adiabatic temperature $\Delta T_{EC}$ of up to 7.6° C. could thus be measured at 30° C. under an electric field of 100 V/μm [see: LI, Xinyu, QIAN, Xiao-shi, LU, S. G., et al., Tunable temperature dependence of electrocaloric effect in ferroelectric relaxor poly(vinylidene fluoride-trifluoroethylene-chlorofluoroethylene terpolymer). Applied Physics Letters, 2011, Vol. 99, No. 5, p. 052907].

In order to be able to develop effective cooling devices, there currently exists a need to provide VDF-based fluoropolymers having improved electrocaloric properties, that is to say exhibiting a greater variation in adiabatic temperature $\Delta T_{EC}$, in a given variable electric field. The electric field used to obtain the high variation in adiabatic temperature has to be as low as possible in order to limit the energy consumption and to limit the use of expensive and dangerous control electronics.

From this viewpoint, Zhang, G. et al. proposed to add nanometric fillers, such as barium strontium titanate (BST) nanowires, to a 62.3/29.7/7.8 mol % P(VDF-TrFE-CFE). The P(VDF-TrFE-CFE) formulations, thus provided with fillers, made it possible to measure a $\Delta T_{EC}$ having a maximum value at least greater than 7.5° C. over a range of measurement temperatures ranging from 0 to 60° C. under an electric field with an amplitude equal to 75 V/μm. In comparison, there was measured, on the filler-free P(VDF-TrFE-CFE), a $\Delta T_{EC}$ of between 3.5 and 4.5° C., over a range of measurement temperatures from 0 to 60° C., under an electric field with an amplitude equal to 75 V/μm [ZHANG, G. et al., Ferroelectric Polymer Nanocomposites with Complementary Nanostructured Fillers for Electrocaloric Cooling with High Power Density and Great Efficiency. ACS *Applied Energy Materials,* 2018, 1(3), pp. 1344-1354].

The introduction of nanometric fillers into the polymer matrix nevertheless exhibits several disadvantages. It first requires very good dispersion of these fillers and therefore complicates the shaping of the material. In addition, the handling of nanoparticles in the process for the manufacture of the polymers is complex due to the potential risks of the nanoparticles in the free state to human health. Finally, the presence of fillers tends to mechanically weaken the material and to reduce its dielectric strength.

WO 2019075061 postulates, without giving an example, that polymers of formula (I):

[Chem 1]

(I)

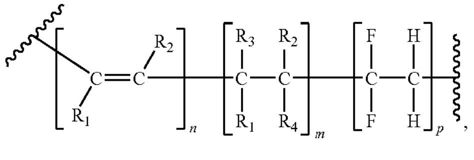

in which, at each instance of the units: n and m are integers independently chosen between 1 and 1000 and p is an integer greater than n+m; $R_1$, $R_2$, $R_3$ and $R_4$ being chosen independently from: —H, —F, —Cl, —Br, —I, $—NH_2$, —NHZ, $—NZ_2$, $—BH_2$, —BHZ, $—BZ_2$, OZ, —SeZ, —TeZ, $—SO_2Z$, —OCOZ, —NHCOZ, —COOZ, $—CONH_2$, —CONHZ, $—CONZ_2$, $—CH_2F$ and $—CHF_2$;

Z being, at each instance of a unit, independently chosen from a hydrogen atom, an alkyl group, an aryl group or an aralkyl group, would have advantageous electrocaloric properties.

A process for the preparation of the polymers (I) has been disclosed and consists in bringing an initial polymer (II) into contact with an alkaline hydroxide (strong base pKa >14), such as LiOH, NaOH, KOH or CsOH, in order to bring about dehydrohalogenation, the polymer (II) having the formula:

[Chem 2]

(II)

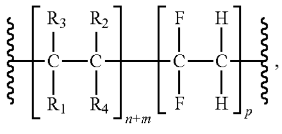

in which n, m, p, $R_1$, $R_2$, $R_3$ and $R_4$ are as defined for the polymer of formula 1.

The only example of WO 2019075061 shows the manufacture of a polymer comprising double bonds, this polymer being manufactured from the dehydrofluorination of PVDF in dimethylacetamide by a saturated solution of sodium hydroxide in isopropanol.

No measurement of the electrocaloric properties of the polymer manufactured was carried out. The type of double bonds in the polymer manufactured was not characterized either.

Nevertheless, in the light of U.S. Pat. No. 4,904,739, which relates to a similar process for the dehydrofluorination of PVDF, it seems that the polymer manufactured comprises a high proportion of conjugated double bonds.

Furthermore, it is known to a person skilled in the art that fluoropolymers comprising conjugated double bonds obtained by dehydrofluorination by virtue of the action of a strong base results in polymers which are not very stable thermally, which turn yellow, which degrade easily and which are liable to crosslink during the action of a strong base.

In addition, the process exhibits a processing disadvantage in that it uses dimethylacetamide as solvent, which is harmful (by contact/inhalation) and CMR (can harm the fetus).

Thus, in order to be able to develop effective cooling devices, there currently exists a need to provide VDF-based fluoropolymers having improved electrocaloric properties, that is to say exhibiting a greater variation in adiabatic temperature $\Delta T_{EC}$, in a given variable electric field and in a given environment (temperature conditions). The electric field used to obtain a high variation in adiabatic temperature preferentially has to be as low as possible in order to limit the energy consumption and to limit the use of expensive and dangerous (high voltages) control electronics.

Objectives

The present invention proposes to provide an improved fluoropolymer compared with those of the prior art, exhibiting a significant electrocaloric effect when it is subjected to a variable electric field, as well as a composition and a film deriving therefrom, and associated uses.

The objective is also to propose, according to certain embodiments at least, an improved fluoropolymer exhibiting a high dielectric strength in order to withstand numerous cycles of electric fields without breakdown.

The objective is additionally to propose, according to certain embodiments at least, an improved fluoropolymer exhibiting good thermal and/or chemical stability in order to envisage the lasting and reliable use of the polymer in devices.

SUMMARY OF THE INVENTION

The invention relates to a polymer exhibiting an electrocaloric effect under the effect of a variable electric field, said polymer comprising:

from 30 mol % to 90 mol % of unit of formula: $—(CF_2—CH_2)—$ (III), from 1 mol % to 59.9 mol % of at least one unit of formula: $—(CX_1X_2—CX_3X_4)—$ (IV), from 0 mol % to (20-N) mol % of at least one unit of formula: $—(CY_1Y_2—CY_3Z)—$ (V), N mol % of ethylenic unit(s) chosen from the list consisting of:

$—(CY_3{=}CF)—$, $—(CY_3{=}CX_1)—$, $—(CY_3{=}CX_2)—$, $—(CY_1{=}CY_3)—$, $—(CY_2{=}CY_3)—$ and their mixture, in which:

$X_1$ and $X_2$ independently denote: —H, —F or alkyl groups comprising from 1 to 3 carbon atoms which are optionally partially or completely fluorinated, $X_3$ and $X_4$ independently denote: —F or alkyl groups comprising from 1 to 3 carbon atoms which are optionally partially or completely fluorinated, except for the combination in which: $X_1$ and $X_2$ are both: —H and $X_3$ and $X_4$ are both: —F, $Y_1$ and $Y_2$ independently denote: —H, —F, —CI or alkyl groups comprising from 1 to 3 carbon atoms which are optionally partially or completely fluorinated, $Y_3$ denotes: —F, —CI or alkyl groups comprising from 1 to 3 carbon atoms which are optionally partially or completely fluorinated, Z denotes a halogen atom other than: —F, and N is a number ranging from 0.1 to 10.0.

The polymer according to the invention essentially does not exhibit a conjugated carbon-carbon double bond.

The inventors of the present invention have found, completely surprisingly, that such polymers have better electrocaloric properties than polymers with substantially identical compositions but without a double bond and/or than polymers with substantially identical compositions but with conjugated double bonds, under the same conditions of variation in electric field and at one and the same measurement temperature. Their finding is based on measurements of variations in adiabatic temperatures carried out, on a test bench 1 as represented in FIG. 1, on polymers according to the invention. They compared these measurements with measurements carried out on polymers with a substantially identical composition but without a carbon-carbon double bond and/or polymers with a substantially identical composition but with conjugated carbon-carbon double bonds, under the same conditions of variation in electric field and at one and the same measurement temperature.

The inventors have also observed that at least some of these polymers, indeed even the majority of these polymers, were chemically and thermally stable and had good dielectric strength.

According to some embodiments, $X_1$ can denote: —H or —F; and $X_2$, $X_3$ and $X_4$ denote, all three: —F.

According to some embodiments, Z denotes: —Cl.

According to some embodiments, $Y_3$ denotes: —F, and $Y_1$ and $Y_2$ both denote: —H or —F.

According to some embodiments, the polymer according to the invention comprises at least 1 mol %, preferentially at least 2 mol %, more preferably at least 3 mol %, of unit of formula (V) and extremely preferably at least 4 mol % of unit of formula (V).

According to some specific embodiments, the polymer with $X_1$ denoting: —H; $X_2$, $X_3$ and $X_4$ denoting, all three: —F; $Y_3$ denoting: —F; $Y_1$ and $Y_2$ both denoting: —H; and Z denoting —Cl; has a value of N chosen between 0.1 and 2, preferentially between 0.1 and 1.5 and more preferentially still between 0.1 and 1.

According to some specific embodiments, the polymer with $X_1$ denoting: —H; $X_2$, $X_3$ and $X_4$ denoting, all three: —F; $Y_1$, $Y_2$ and $Y_3$ denoting, all three: —F; and Z denoting: —Cl; has a value of N chosen between 0.1 and 10.0, preferentially between 1.0 and 8.0, more preferentially between 2.0 and 7.5 and extremely preferably between 2.2 and 7.0.

The polymer according to the invention is advantageously a relaxor ferroelectric polymer.

In some embodiments, the polymer has a remanent polarization of less than or equal to 20 $mC/m^2$ and/or a coercive field of less than or equal to 25 $V·\mu m^{-1}$, the remanent polarization and coercive field measurements both being carried out at a temperature of 25° C., at a frequency of 1 Hz and at a field of 150 V/μm.

According to some embodiments, the polymer has a weight-average molecular weight of greater than or equal to 200 000 g/mol, preferably of greater than or equal to 300 000 g/mol, preferably of greater than or equal to 400 000 g/mol.

According to some embodiments, the polymer has an enthalpy of fusion of greater than or equal to 10 J/g, preferentially an enthalpy of fusion of greater than or equal to 15 JIg, the enthalpy of fusion being measured according to the standard ISO 11357-2: 2013, in second heating with temperature gradients of 10° C./min.

A high weight-average molecular weight makes it possible in particular to achieve high degrees of crystallization of the polymer. Polymers having a high weight-average molecular weight and/or a high degree of crystallization have in particular better dielectric strength and particularly advantageous mechanical properties making possible the manufacture of sufficiently mechanically strong film.

According to some embodiments, the polymer has a relative dielectric permittivity of greater than or equal to 15, preferentially of greater than or equal to 20, more preferentially of greater than or equal to 40 and extremely preferentially of greater than or equal to 55, over a range of temperatures of at least 5° C., preferentially of at least 10° C., preferentially of at least 20° C. and extremely preferentially of at least 30° C., said relative dielectric permittivity being measured at 1 kHz.

According to some embodiments, the polymer has a permittivity maximum at a temperature of less than or equal to 60° C., preferably at a temperature of less than or equal to 50° C. and more preferably at a temperature of less than or equal to 40° C., said relative dielectric permittivity being measured at 1 kHz.

The polymer according to the invention is capable of being obtained by a process comprising:

a) the provision of an initial polymer comprising, in total moles of polymer:

from 40 mol % to 90 mol % of unit of formula:

$(CF_2—CH_2)—$ (III), from 9.9 mol % to 59.9 mol % of at least one unit of formula: $—(CX_1X_2—CX_3X_4)—$ (IV), from 0.1 mol % to 20 mol % of at least one unit of formula: $—(CY_1Y_2—CY_3Z)—$ (V), in which: $X_1$, $X_2$, $X_3$, $X_4$, $Y_1$, $Y_2$, $Y_3$ and Z are as defined above;

b) the dehydrohalogenation of said initial polymer, said dehydrohalogenation consisting essentially of the elimination, at least partially, of: —Z and of an adjacent hydrogen.

According to some embodiments, the polymer obtained has a variation in adiabatic temperature which is at least greater by 0.5° C., preferentially at least greater by 10° C., more preferentially still at least greater by 1.5° C., with respect to the variation in adiabatic temperature of the initial polymer, at at least one measurement temperature, the measurements of variations in adiabatic temperatures being carried out at a variable electric field with an amplitude equal to 86 V/μm.

According to some embodiments, the polymer has a relative dielectric permittivity maximum which is at least greater by 5%, preferentially at least greater by 10% and more preferentially at least greater by 25%, with respect to the dielectric permittivity maximum of said initial polymer, said relative dielectric permittivity being measured at 1 kHz.

According to some embodiments, the dehydrohalogenation stage in the process is carried out with a reaction progress of at least 0.1, preferentially with a reaction progress of at least 0.2.

The invention also relates to a composition comprising one or more polymers according to the invention and one or more liquid vehicle(s).

The invention also relates to a film comprising the polymer according to the invention. The film has a thickness of greater than or equal to 0.1 micrometer.

Preferentially, it can have a thickness ranging from 1 micrometer to 100 micrometers. More preferably, it can have a thickness ranging from 1 micrometer to 50 micrometers, in particular a thickness ranging from 1 micrometer to 10 micrometers. If the thickness of the film is too low, the latter becomes too weak mechanically. If the thickness of the film is too great, excessively high voltages have to be applied to obtain a given electric field.

The invention finally relates to possible uses of the polymer, in particular of the polymer in the form of a film.

The polymer according to the invention can be used in a heat transfer system, in particular a cooling system.

The polymer according to the invention can also be used in an energy storage system, in particular a capacitor, in an organic transistor, in an actuator, or also in an electrostatic clutch.

DETAILED DESCRIPTION OF THE INVENTION

Fluoropolymer Comprising Essentially Nonconjugated Double Bonds

The polymer according to the invention comprises, preferentially essentially consists of, more preferably consists of:

from 30 mol % to 90 mol % of unit of formula: $—(CF_2—CH_2)—$ (III), from 1 mol % to 59.9 mol % of at least one unit of formula: $—(CX_1X_2—CX_3X_4)—$ (IV), from 0 mol % to (20-N) mol % of at least one unit of formula: $—(CY_1Y_2—CY_3Z)—$ (V), N mol % of ethylenic unit(s) chosen from the list consisting of: $—(CY_3═CF)—$, $—(CY_3═CX_1)—$, $—(CY_3═CX_2)—$, $—(CY_1═CY_3)—$, $—(CY_2═CY_3)—$ and their mixture;

in which:

$X_1$ and $X_2$ independently denote: —H, —F or alkyl groups comprising from 1 to 3 carbon atoms which are optionally partially or completely fluorinated, $X_3$ and $X_4$ independently denote: —F or alkyl groups comprising from 1 to 3 carbon atoms which are optionally partially or completely fluorinated, except for the combination where: $X_1$ and $X_2$ are both: —H and $X_3$ and $X_4$ are both: —F, $Y_1$ and $Y_2$ independently denote: —H, —F, —Cl or alkyl groups comprising from 1 to 3 carbon atoms which are optionally partially or completely fluorinated, $Y_3$ independently denotes: —F, —Cl or alkyl groups comprising from 1 to 3 carbon atoms which are optionally partially or completely fluorinated, Z denotes a halogen atom other than: —F, and N is a number from 0.1 to 10.

The molar composition of the units in the fluoropolymers can be determined by various means, such as infrared spectroscopy or Raman spectroscopy.

Conventional methods of elemental analysis of elements carbon, fluorine and chlorine or bromine or iodine, such as X-ray fluorescence spectroscopy, make it possible to calculate unambiguously the composition by weight of the polymers, from which the molar composition is deduced. Use may also be made of multinuclear, in particular proton ($^1H$) and fluorine ($^{19}F$), NMR techniques, by analysis of a solution of the polymer in an appropriate deuterated solvent. The NMR spectrum is recorded on an FT-NMR spectrometer equipped with a multinuclear probe. The specific signals given by the various monomers in the spectra produced according to one or the other nucleus are then located. Thus, for example, the unit resulting from the polymerization of VDF gives, in proton NMR, a specific signal for the $—CH_2—$ groups (broad unresolved peak centered at 3 ppm). Likewise, the unit resulting from TrFE gives, in proton NMR, a specific signal characteristic of the —CFH— group (at approximately 5 ppm). In fluorine NMR, the signals resulting from the $—CF_2—$ and —CFCl— units of CFE and CTFE are mixed up with those of the $—CF_2—$ units of VDF and TrFE between −90 and −132 ppm. The —CHF— unit of TrFE gives characteristic signals between −194 and −220 ppm. The combination of the proton and fluorine NMR spectra makes it possible to unambiguously deduce the molar composition of the polymers.

The presence of conjugated and nonconjugated double bonds in the fluoropolymers can be evaluated by different spectroscopic methods and in particular Raman spectroscopy. The valence vibration band at 1720 $cm^{-1}$ corresponds to the presence of a single type of C═C double bond, attributable to the —CF═CH— bonds. Conjugated double bonds are observed by valence vibration bands which are wider and at lower wavenumbers, between 1500 and 1700 $cm^{-1}$. The presence of double bonds can be quantified by proton NMR by virtue of the appearance of signals between 6.0 and 6.7 ppm.

The inventors have been able to demonstrate that the presence of 0.1% to N % of units having carbon-carbon double bonds, these double bonds being nonconjugated in the structure of the polymer, made it possible to obtain polymers having a high relative dielectric constant and/or a large electrocaloric effect.

In addition, these polymers are, at least according to some embodiments, stable over time under usual conditions of use and implementation. That is to say that, under the usual conditions of use, in particular the uses provided for in the present patent application, they do not degrade or degrade only slightly, they do not turn yellow or turn yellow only slightly, they do not crosslink or crosslink only slightly, and their viscosity, in solution or in the melt, does not vary or varies only slightly.

The polymer comprises from 30 mol % to 90 mol %, with respect to the total number of moles of units of the composition of the polymer, of units resulting from vinylidene difluoride.

According to some embodiments, the polymer can comprise from 30 mol % to 35 mol %, from 35 mol % to 40 mol %, from 40 mol % to 45 mol %, from 45 mol % to 50 mol %, from 50 mol % to 60 mol %, from 60 mol % to 70 mol %, from 70 mol % to 80 mol %, from 80 mol % to 85 mol % or from 85 mol % to 90 mol % of units resulting from vinylidene difluoride.

The polymer comprises from 1 mol % to 59.9 mol %, with respect to the total number of moles of units of the composition of the polymer, of unit(s) of formula (IV). According to some embodiments, the polymer can comprise from 5 mol % to 10 mol %, from 10 mol % to 15 mol %, from 15 mol % to 20 mol %, from 20 mol % to 30 mol %, from 40 mol % to 50 mol %, from 50 mol % to 55 mol % or from 55 mol % to 59.9 mol % of unit(s) of formula (IV).

The polymer can comprise a single unit of formula (IV) or, on the contrary, several different units of formula (IV).

According to some embodiments, the unit/units of formula (IV) can result from monomeric unit(s) chosen from the list consisting of: trifluoroethylene (TrFE), tetrafluoroethylene (TFE), hexafluoropropylene (HFP), trifluoropropenes and in particular 3,3,3-trifluoropropene, tetrafluoropropenes and in particular 2,3,3,3-tetrafluoropropene or 1,3,3,3-tetrafluoropropene, hexafluoroisobutylene, perfluorobutylethylene and pentafluoropropenes and in particular 1,1,3,3,3-pentafluoropropene or 1,2,3,3,3-pentafluoropropene.

According to some alternative forms, units of formula (IV) resulting from several different fluoromonomers can be present in the polymer.

According to some embodiments, $X_1$ can denote: —H or —F; and $X_2$, $X_3$ and $X_4$ denote, all three: —F. In other words, according to these embodiments, the polymer according to the invention can therefore be a copolymer comprising units resulting from trifluoroethylene (TrFE) and/or from tetrafluoroethylene (TFE).

According to some embodiments, Z can denote: —Cl, —Br or —I. Advantageously Z can denote: —Cl.

The polymer comprises from 0 mol % to (20-N) mol %, with respect to the total number of moles of units of the composition of the polymer, of units of formula (V), N being a number ranging from 0.1 to 10.0.

According to some embodiments, the polymer can comprise at least 1 mol %, preferentially at least 2 mol %, more preferably at least 3 mol % and extremely preferably at least 4 mol % of unit(s) of formula (V). The presence of unit(s) of formula (V) in addition to the units of formulae (III) and (IV) makes it possible generally to obtain a polymer of relaxor ferroelectric type, the advantages of which are described in detail below. In particular, the polymer can comprise from 4 mol % to 15 mol % of unit(s) of formula (V).

The polymer can comprise a single unit of formula (V) or, on the contrary, several different units of formula (V).

According to some embodiments, the unit/units of formula (V) can result from monomeric unit(s) chosen from the list consisting of: 1,1-chlorofluoroethylene (1,1-CFE), 1,2-chlorofluoroethylene (1,2-CFE), chlorotrifluoroethylene (CTFE), 2-chloro-3,3,3-trifluoropropene (1233xf), 1-chloro-3,3,3-trifluoropropene (1233zd), 1,2-dichloro-1,2-difluoroethylene, 1,1-dichloro-1,1-difluoroethylene and 1,1,2-trichloro-2-fluoroethylene.

Advantageously, $Y_3$ can denote: —F, and $Y_1$ and $Y_2$ can both denote: —H or —F. In other words, according to these embodiments, the polymer can comprise units resulting from 1,1-CFE and/or CTFE.

In particular, according to some embodiments, the polymer can comprise units resulting from vinylidene fluoride (VDF), TrFE and CFE, or comprise units resulting from VDF, TrFE and CTFE, or comprise units resulting from VDF, TrFE, CFE and CTFE, or comprise units resulting from VDF, TFE and CFE, or comprise units resulting from VDF, TFE and CTFE, or comprise units resulting from VDF, TFE, CFE and CTFE, said polymers all additionally comprising essentially nonconjugated carbon-carbon double bonds. The polymers of the above list can moreover comprise units resulting from one or more additional monomers, such as, for example, units resulting from HFP.

The polymer comprises N mol % of ethylenic unit(s) chosen from the list consisting of: —($CY_3$═CF)—, —($CY_3$═$CX_1$)—, —($CY_3$═$CX_2$)—, —($CY_1$═$CY_3$)—, —($CY_2$═$CY_3$)— and their mixture. "N" is a number between 0.1 and 10 corresponding to the molar percentage of said ethylenic units with respect to the total number of moles of units of the composition of the polymer. N can in particular be a number ranging from 0.1 to 0.2, or ranging from 0.2 to 0.3, or ranging from 0.3 to 0.5, or ranging from 0.5 to 1.0, or ranging from 1.0 to 2.0, or ranging from 2.0 to 3.0, or ranging from 3.0 to 4.0, or ranging from 4.0 to 5.0, or ranging from 5.0 to 6.0, or ranging from 6.0 to 7.0, or ranging from 7.0 to 8.0, or ranging from 8.0 to 9.0, or ranging from 9.0 to 10.0. The number "N" can advantageously be chosen so that, at a temperature of use envisaged for the polymer, the dielectric permittivity and/or $\Delta T_{EC}$ are at a maximum.

In the embodiments where the polymer comprises units resulting from vinylidene fluoride (VDF), TrFE and CFE, in particular in the case where the polymer results from P(VDF-TrFE-CFE) as initial polymer, N is preferentially chosen between 0.1 and 2, more preferentially between 0.1 and 1.5 and extremely preferably between 0.1 and 1. The number N can in particular be chosen between 0.1 and 0.5.

In the embodiments where the polymer comprises units resulting from VDF, TrFE and CTFE, in particular in the case where the polymer results from P(VDF-TrFE-CTFE) as initial polymer, N is preferentially chosen between 0.1 and 10.0, preferentially between 1.0 and 8.0, more preferentially between 2.0 and 7.5 and extremely preferably between 2.2 and 7.0. The number N can in particular be chosen between 3.0 and 6.5.

The polymer essentially does not exhibit a conjugated carbon-carbon double bond. The term “conjugated carbon-carbon double bond” is understood to mean any alternation of single bond(s) with double bonds, of π-σ-π type.

Thus, the polymer exhibits a proportion of conjugated carbon-carbon double bonds, with respect to the total number of carbon-carbon double bonds, generally of less than or equal to 10%, or less than or equal to 9%, or less than or equal to 8%, or less than or equal to 7%, or less than or equal to 6%, or less than or equal to 5%, or less than or equal to 4%, or less than or equal to 3%, or less than or equal to 2%. Advantageously, the polymer exhibits a proportion of conjugated carbon-carbon double bonds, with respect to the total number of carbon-carbon double bonds, of less than or equal to 1%, or less than or equal to 0.1% and ideally tending toward 0.

The polymer can be random and linear.

The polymer according to the invention exhibits an electrocaloric effect under the effect of a variable electric field.

Advantageously, the polymer exhibits a variation in adiabatic temperature $\Delta T_{EC}$ of at least 1° C. at at least one measurement temperature, the measurements of variations in adiabatic temperatures being carried out at an electric field of given amplitude ΔE. The measurement temperature corresponds to the temperature to which the sample is brought before it is subjected to the variation in electric field ΔE causing the electrocaloric effect.

Preferably, the polymer exhibits a variation in adiabatic temperature $\Delta T_{EC}$ of at least 1.5° C., or of at least 2° C., or of at least 2.5° C., or of at least 3° C., or of at least 3.5° C., or of at least 4.0° C., or of at least 4.5° C., or of at least 5° C., or of at least 6° C., or of at least 7° C., or of at least 8° C., or of at least 9° C., or of at least 10° C., in a given variable field, at a given measurement temperature.

The electric field used to demonstrate an electrocaloric effect must be variable. This is because it is the variation in electric field which causes the electrocaloric effect.

Generally, the higher the amplitude of the electric field, the greater the electrocaloric effect. However, the maximum amplitude of the electric field must be appropriate so as not to reach the breakdown voltage of the polymer. In addition, the production of high voltages requires a specific appliance which is highly energy-consuming, which is not necessarily desirable. According to some embodiments, the electric field used to demonstrate a significant electrocaloric effect for a use as described below can have a maximum amplitude of less than or equal to 500 V/μm, or less than or equal to 400 V/μm, or less than or equal to 300 V/μm, or less than or equal to 200 V/μm, or less than or equal to 150 V/μm, or less than or equal to 140 V/μm, or less than or equal to 130 V/μm, or less than or equal to 120 V/μm, or less than or equal to 110 V/μm, or less than or equal to 100 V/μm, or less than or equal to 90 V/μm.

According to some embodiments, the electric field can have an amplitude of greater than or equal to 30 V/μm, or greater than or equal to 40 V/μm, or greater than or equal to 50 V/μm.

According to some embodiments, the polymer has a dielectric strength of greater than or equal to 200 V/μm, preferentially of greater than or equal to 300 V/μm, more preferentially of greater than or equal to 400 V/μm and extremely preferably of greater than or equal to 500 V/μm. The dielectric strength can be measured according to the standard ASTM D3755-97.

An electric field of square-wave type, with a maximum value equal to ΔE and a minimum value equal to 0, can typically be used.

In order to properly measure $\Delta T_{EC}$, the frequency of the electric field must be low enough to make it possible for the heat to diffuse through the polymer.

Frequencies ranging from 1 mHz to 100 Hz, preferentially frequencies ranging from 0.1 Hz to 10 Hz, can be used.

The measurement temperature can be between the glass transition temperature and the melting point of the polymer. The term “glass transition temperature” is understood to denote the temperature at which an at least partially amorphous polymer changes from a rubbery state to a glassy state, or vice versa, as measured by differential scanning calorimetry (DSC) according to the standard ISO 11357-2:2013, in second heating, using a heating rate of 10° C./min. The term “melting point” is understood to denote the temperature at which an at least partially crystalline polymer passes into the viscous liquid state, as measured by differential scanning calorimetry (DSC) according to the standard ISO 11357-3:2018, in second heating, using a heating rate of 10° C./min.

Thus, the measurement temperature can in particular be from −20° C. to 150° C., preferentially from 0° C. to 100° C., more preferentially from 15° C. to 60° C. and extremely preferably from 20° C. to 40° C.

The polymer can be a ferroelectric. “Conventional ferroelectric” polymers, often simply denoted as “ferroelectrics”, of the P(VDF-TrFE) type, are characterized by a broad hysteresis loop of the electric displacement-applied electric field curve. For these materials, this loop is characterized by a high coercive field at 25° C., typically greater in absolute value than 45 V/μm, and a high remanent polarization at 25° C., typically of greater than 50 $mC/m^2$. These materials have a maximum of their electrocaloric properties at temperatures close to their Curie temperature. At this temperature, a ferroelectric→paraelectric (FE→PE) crystal structure transition, called the Curie transition, takes place, corresponding to an abrupt depolarization of the macroscopic ferroelectric domains. This transition is narrow, of the first order, and is characterized by a narrow maximum of the dielectric permittivity, the position of which does not depend on the frequency of application of the electric field. The Curie temperature can be adjusted as a function of the composition of the polymer: the higher the proportion of vinylidene fluoride, the higher the Curie temperature.

This temperature typically varies between 60° C. and 150° C. for molar percentages of vinylidene fluoride in the P(VDF-TrFE) copolymer of between 55 mol % and 82 mol %. Ferroelectric polymers have advantageous electrocaloric properties but these properties are limited to temperatures which are too high to be able to be used in refrigeration devices suitable for many applications. Furthermore, the narrowness of the electrocaloric performance peak associated with the narrowness of the Curie transition limits their use.

Advantageously, the polymer can be a relaxor ferroelectric. “Relaxor ferroelectric” polymers are characterized by a relaxor ferroelectric (RFE)→paraelectric (PE) crystal transition over a wide range of temperatures. At the level of this transition, a broad peak of dielectric permittivity is observed, the temperature of this maximum depending on the frequency of the applied electric field: the lower the frequency of the electric field, the more the dielectric permittivity maximum is shifted toward low temperatures. At the temperatures of the (RFE)→(PE) transition or slightly greater temperatures, the application of an electric field makes it possible to generate and to align the nanopolar regions, inducing a variation in entropy, and thus a significant electrocaloric effect over a wide range of temperatures.

Relaxor ferroelectric polymers are characterized at 25° C., and at a frequency of approximately 1 Hz, by a hysteresis loop of the "electric displacement" as a function of the "applied electric field" curve which is much finer than the hysteresis loop of a ferroelectric polymer. They typically have a coercive field of less than or equal in absolute value to 45 V/μm and a remanent polarization of less than or equal to 40 $mC/m^2$. According to some preferential embodiments, the polymer according to the invention can have a coercive field of less than or equal to 25 V/μm and a remanent polarization of less than or equal to 20 $mC/m^2$. Relaxor ferroelectric polymers are generally obtained by introducing defects into the crystal structure of ferroelectric polymers, thus decreasing the size of the polar domains. This can, for example, be done by irradiating a conventional ferroelectric polymer. However, it is preferable to obtain a relaxor ferroelectric nature by the presence of units resulting from specific monomers, such as CFE or CTFE.

By comparison with conventional ferroelectric polymers, the phase transition corresponding to the dielectric permittivity maximum and/or to the $\Delta T_{EC}$ maximum can be obtained at lower temperature, in particular between 0° C. and 100° C., and in some cases between 20° C. and 60° C. Thus, relaxor ferroelectric polymers have advantageous electrocaloric properties, over a wide range of temperatures, and in particular at temperatures close to ambient temperature. They are therefore particularly advantageous for the production of electrocaloric devices.

According to some embodiments, the polymer can have a weight-average molecular weight of greater than or equal to 200 000 g/mol, preferably of greater than or equal to 300 000 g/mol, preferably of greater than or equal to 400 000 g/mol. This makes it possible to confer, on films resulting from the polymer according to the invention, suitable mechanical properties. The molecular weight distribution can be estimated by SEC (size exclusion chromatography) with dimethylformamide (DMF) as eluent, with a set of three columns of increasing porosity. The stationary phase is a styrene-DVB gel. The detection process is based on a measurement of the refractive index, and the calibration is carried out with polystyrene standards. The sample is dissolved at 0.5 g/l in DMF and filtered through a 0.45 μm nylon filter.

According to some embodiments, the polymer has an enthalpy of fusion of greater than or equal to 10 J/g, preferentially an enthalpy of fusion of greater than or equal to 15 J/g, the enthalpy of fusion being measured according to the standard ISO 11357-2: 2013, in second heating with temperature gradients of 10° C./min. Generally, the higher the enthalpy of fusion, or equivalently the higher the degree of crystallinity, the more intense the electrocaloric effect in the polymer.

The dielectric permittivity is a physical property that describes the response of a given medium to a given electric field. It can be measured at 1 kHz at a given measurement temperature. A method for measuring the dielectric permittivity has been described in detail in the part devoted to the examples.

The polymer according to the invention can have a relative dielectric permittivity of greater than or equal to 15, preferentially of greater than or equal to 20, more preferentially of greater than or equal to 40 and extremely preferentially of greater than or equal to 55, over a range of temperatures of at least 5° C., preferentially of at least 10° C., preferentially of at least 20° C. and extremely preferentially of at least 30° C.

According to some embodiments, the permittivity maximum of the polymer is at a measurement temperature of less than or equal to 60° C., preferably at a temperature of less than or equal to 50° C. and more preferably at a temperature of less than or equal to 40° C.

Manufacturing Process The polymer according to the invention can be obtained by the process comprising:

a) the provision of an initial polymer comprising, preferentially essentially consisting of, more preferably consisting of, in total moles of polymer:
   from 40 mol % to 90 mol % of unit of formula: $-(CF_2-CH_2)-$ (III),
   from 9.9 mol % to 59.9 mol % of at least one unit of formula: $-(CX_1X_2-CX_3X_4)-$(IV),
   from 0.1 mol % to 20 mol % of at least one unit of formula: $-(CY_1Y_2-CY_3Z)-$ (V),
   in which: $X_1$, $X_2$, $X_3$, $X_4$, $Y_1$, $Y_2$, $Y_3$ and Z are as defined for the polymer according to the invention;
b) the dehydrohalogenation of said initial polymer, said dehydrohalogenation consisting essentially of the elimination, at least partially, of: —Z and of an adjacent hydrogen.

The polymer obtained exhibits essentially nonconjugated carbon-carbon double bonds. More specifically, it comprises N mol % of ethylenic unit(s) chosen from the list consisting of: $-(CY_3{=}CF)-$, $-(CY_3{=}CX_1)-$, $-(CY_3{=}CX_2)-$, $-(CY_1{=}CY_3)-$, $-(CY_2{=}CY_3)-$ and their mixture as well as, if appropriate, isolated $-(CF_2)-$ units not forming part of a $-(CF_2-CH_2)-$ unit and/or isolated $-(CX_3X_4)-$ units not forming part of unit(s) of formula (IV) and/or isolated $-(CY_1Y_2)-$ units not forming part of unit(s) of formula (V).

The polymer has a variation in adiabatic temperature $\Delta T_{EC}$ which is at least greater by 0.5° C., preferentially at least greater by 1° C., more preferentially still at least greater by 1.5° C., with respect to the variation in adiabatic temperature of the initial polymer, at at least one measurement temperature, the measurements of variations in adiabatic temperatures being carried out at a variable electric field having a maximum amplitude equal to 86 V/μm.

The initial polymer can be obtained according to processes known from the prior art. It can in particular be prepared by radical polymerization according to a solution, suspension, emulsion or microemulsion polymerization process. The copolymerization reaction is generally carried out in the presence of a radical initiator. The latter can, for example, be a tert-alkyl peroxyester, such as tert-butyl peroxypivalate (or TBPPI) or tert-amyl peroxypivalate, a peroxydicarbonate, such as bis(4-(tert-butyl)cyclohexyl) peroxydicarbonate, sodium, ammonium or potassium persulfate, benzoyl peroxide and its derivatives, a tert-alkyl hydroperoxide, such as tert-butyl hydroperoxide, a tert-alkyl peroxide, such as tert-butyl peroxide, or a tert-alkylperoxyalkane, such as 2,5-bis(tert-butylperoxy)-2,5-dimethylhexane. Alternatively or additionally, an azo initiator or a redox system can be used as radical initiator. The polymer can also be obtained by reduction of a copolymer of P(VDF-CTFE) type to give a copolymer of P(VDF-TrFE-CTFE) type (see: WANG, Zhiming, ZHANG, Zhicheng and CHUNG, T. C. Mike. High dielectric VDF/TrFE/CTFE terpolymers prepared by hydrogenation of VDF/CTFE copolymers: synthesis and characterization. Macromolecules, 2006, Vol. 39, No. 13, pp. 4268-4271).

The initial polymer can be selected as a function of its known electrocaloric properties. An initial polymer having good electrocaloric properties at temperatures close to the temperatures of use of the polymer according to the invention can be advantageously chosen.

Alternatively or in addition, the initial polymer can be selected as a function of the temperature at which its dielectric constant is at a maximum. An initial polymer having a dielectric constant maximum at a temperature close to the temperatures of use of the polymer according to the invention will be advantageously chosen.

The dehydrohalogenation of the initial polymer makes it possible to obtain carbon-carbon double bonds. Formally, it consists of an elimination mainly of a —Z atom and of a hydrogen on a carbon adjacent to that of the leaving —Z atom.

The dehydrohalogenation, called dehydrochlorination in the case where —Cl is the leaving halogen atom, is carried out by mixing with a certain base, at a certain concentration, under certain temperature conditions and for a certain period of time, so as to promote the elimination of the halogen —Z and to prevent the elimination of —F.

The base must be a base strong enough to be able to eliminate —Z, without, however, eliminating —F. The base can in particular have a pKa ranging from 8 to 12, preferably ranging from 9 to 11. The base can advantageously be a nonaromatic and non-nucleophilic tertiary amine, such as triethylamine. The base, for example triethylamine, can represent from 0.01 to 2 molar equivalents, with respect to the number of moles of units of formula (V).

According to some embodiments, the proportion of base, for example triethylamine, is preferably adjusted so as to retain units of formula (V) within the polymer on conclusion of the dehydrohalogenation stage. The base can in particular represent from 0.1 to 1 molar equivalent, or also from 0.15 to 0.5 molar equivalent, with respect to the number of moles of units of formula (V). In addition, the concentration of the base, the temperature conditions of the dehydrohalogenation, thus the duration of the dehydrohalogenation, can be adapted by a person skilled in the art in order to adjust the progress of the dehydrohalogenation reaction and/or to limit the formation of conjugated carbon-carbon double bonds.

According to some embodiments, the dehydrohalogenation is carried out with a reaction progress of at least 0.1, preferentially with a reaction progress of at least 0.2.

In some embodiments, the stage of reacting the initial polymer with the base can be followed by a stage of elimination of the base which is in excess.

According to some embodiments, the dehydrohalogenation is carried out so as to obtain a proportion of conjugated carbon-carbon double bonds, with respect to the total number of carbon-carbon double bonds, of less than or equal to 10%, or less than or equal to 9%, or less than or equal to 8%, or less than or equal to 7%, or less than or equal to 6%, or less than or equal to 5%, or less than or equal to 4%, or less than or equal to 3%, or less than or equal to 2%. Advantageously, the dehydrohalogenation is carried out so as to obtain a proportion of conjugated carbon-carbon double bonds, with respect to the total number of carbon-carbon double bonds, of less than or equal to 1%, or less than or equal to 0.1%, or tending toward 0.

According to some embodiments, the dehydrohalogenation stage can in particular be carried out at a temperature ranging from 20 to 80° C., preferably from 30 to 60° C., for a period of time ranging from 1 to 10 hours, preferably from 2 to 8 hours.

The product resulting from the dehydrohalogenation can be purified and/or be formulated in a composition comprising it, such as, for example, an ink, or be shaped in order to form an object, such as, for example, a film.

Composition

The polymer according to the invention can be formulated within a composition. The composition comprises a single or alternatively a mixture of polymers according to the invention.

According to some embodiments, the composition can comprise at least one polymer according to the invention and at least one liquid vehicle for said at least one polymer. This composition, commonly called “ink”, can be prepared by dissolving or suspending the polymer(s) according to the invention in the liquid vehicle. Preferably, the liquid vehicle is a solvent. Advantageously, this solvent is a polar aprotic solvent, in particular which can be chosen from: dimethylformamide; dimethylacetamide; dimethyl sulfoxide; ketones, in particular acetone, methyl ethyl ketone, methyl isobutyl ketone and cyclopentanone; furans, in particular tetrahydrofuran; esters, in particular methyl acetate, ethyl acetate, propyl acetate, butyl acetate and propylene glycol methyl ether acetate; carbonates, in particular dimethyl carbonate; phosphates, in particular triethyl phosphate, or their mixtures. The total concentration by weight of polymers in the liquid vehicle can in particular be from 0.1% to 30%, preferably from 0.5% to 20%.

According to some embodiments, the composition can comprise one or more polymers other than those of the invention and also exhibiting an advantageous electrocaloric effect. For example, the composition can comprise one or more ferroelectric polymers or relaxor ferroelectric polymers not having a carbon-carbon double bond. The composition can in particular comprise initial polymer. According to some embodiments, the composition can comprise one or more polymers other than those of the invention, having in particular polar or reactive functional groups making it possible to improve the adhesion of the composition to a given substrate.

The composition can optionally comprise one or more additives, in particular chosen from surface tension modifiers, rheology modifiers, heat capacity modifiers, aging resistance modifiers, adhesion modifiers, pigments or dyes, flame retardants or also crosslinking aid additives.

The composition can optionally comprise fillers, in particular nanofillers, such as barium strontium titanate (BST) nanowires.

Film

The polymer according to the invention has, according to some embodiments at least, sufficient mechanical properties to allow it to be able to be shaped in the form of a film.

The film can be prepared using the polymer according to the invention or a composition comprising it, for example by application of an ink to a substrate or hot melt compression or extrusion.

The substrate can be of any nature and in particular consist of one or more glass or metal or organic (in particular polymeric) layers.

The film can optionally be stretched, if necessary. Stretching (when it is carried out) is preferably effected with a ratio of at least from 10% to 700%. The film can in particular have a stretch ratio of at least 150%, or of at least 200%, or of at least 250%, or of at least 300%, or of at least 350% or of at least 400%. The stretch ratio corresponds to the ratio of the surface area of the film after stretching to the surface area of the film before stretching.

The films can also, after having optionally been stretched, be annealed, that is to say be heated at a temperature ranging from 70° C. to 140° C., preferably ranging from 100° C. to 120° C., for several hours, then cooled down.

Both stretching and annealing generally make it possible to increase the crystallinity and also the dielectric strength thereof.

The invention makes it possible to obtain films with a thickness of greater than or equal to 0.1 micrometer. For optimum exploitation of the electrocaloric effect, their thickness is advantageously from 1 micrometer to 100 micrometers. Among these thicknesses, the smallest thicknesses may be preferred for not to have to generate excessively high voltages. Thus, films with a thickness of 1 to 50 micrometers and even of 1 to 10 micrometers are particularly preferred.

Electrodes can be deposited on the film, in particular by metallization or by deposition of conductive material (silver, copper, conductive polymer; silver nanowires, carbon black, CNT, and the like).

According to some embodiments, the film prepared from the polymer according to the invention can be a layer of a multilayer film, it being possible for the other layers to comprise a polymer according to the invention, of the same composition or of different composition, another polymer or a nonpolymeric material.

Applications

Due to its electrocaloric properties, the polymer according to the invention can be used in a heat transfer system. The heat transfer system comprises the polymer according to the invention, in particular in the form of a film. The film is capable of being in thermal contact with a load to be cooled and/or a load to be heated and/or a heat transfer fluid. The system also comprises a voltage source intended to be applied to the plate.

The heat transfer system can remove heat or supply heat to another device, such as an electrical or electronic component.

Due to its pyroelectric properties, the polymer according to the invention can be used in a thermal energy recovery system.

Due to its high dielectric constant, the polymer according to the invention can also be used in an energy storage system, in particular a capacitor, an organic transistor or an electrostatic clutch.

Due to its electroactive properties, in particular ferroelectric or relaxor ferroelectric properties, the polymer according to the invention can also be used in actuators (for haptics, microfluidics, loudspeakers, and the like).

FIGURES

FIG. 1 represents a test bench 1 used to measure the electrocaloric performance qualities of polymers as a function of the temperature.

FIG. 2 represents a typical variation in temperature of a plate 2 in a test bench 1 during the application of a square-wave electric field with a height ΔE. ΔE corresponds to the maximum amplitude of the applied electric field and is expressed in volt/meter (V/m). The temperature variation peak, ΔT, comparable to an adiabatic temperature variation, is expressed in Kelvin (K). The x axis represented corresponds to the time in seconds (s).

FIG. 3 represents the liquid $^1$H NMR spectrograms, measured using a Bruker Advance DPX 400 MHz appliance, of comparative example 1 and examples 1 to 5. The x axis represented corresponds to the chemical shift $\delta_H$ in ppm.

FIG. 4 represents the Raman spectrograms, standardized with respect to the vibration band corresponding to $—CF_2—$ between 775 and 950 $cm^{-1}$, of the P(VDF-TrFE-CTFE) terpolymers unmodified (Comp. Ex. 1) and modified (Ex. 1 to Ex. 5). The x axis corresponds to the wavenumber in $cm^{-1}$ and the y axis to the relative intensity.

FIG. 5 represents the Raman spectrograms, standardized with respect to the vibration band corresponding to $—CF_2—$ between 775 and 950 $cm^{-1}$, of the P(VDF-TrFE-CFE) terpolymers unmodified (Comp. Ex. 2) and modified (Comp. Ex. 3 and Ex. 6-7). The x axis corresponds to the wavenumber in $cm^{-1}$ and the y axis to the relative intensity.

FIG. 6A represents the variation in adiabatic temperature $\Delta T_{EC}$ measured on a test bench, such as that of FIG. 1, at a measurement temperature of 25° C. as a function of the maximum amplitude of the applied electric field (expressed in MV/m), for the unmodified P(VDF-TrFE-CTFE) according to comparative example 1 (bottom curve) and for a modified P(VDF-TrFE-CTFE) according to example 4 (top curve).

FIG. 6B represents the variation in adiabatic temperature $\Delta T_{EC}$ (expressed in K) measured on a test bench, such as that of FIG. 1, at a measurement temperature gradient of 10° C./min (expressed in ° C.) and under an electric field with a maximum amplitude ΔE=86 $MV \cdot m^{-1}$, for the unmodified P(VDF-TrFE-CTFE) according to comparative example 1 (bottom curve) and for a modified P(VDF-TrFE-CTFE) according to example 4 (top curve).

FIG. 7A represents the variation in adiabatic temperature $\Delta T_{EC}$ measured on a test bench, such as that of FIG. 1, at a measurement temperature of 25° C. as a function of the maximum amplitude of the applied electric field (expressed in MV/m), for the unmodified P(VDF-TrFE-CFE) according to comparative example 3 (bottom curve) and for a modified P(VDF-TrFE-CFE) according to example 8 (top curve).

FIG. 7B and

FIG. 7C represent the variation in adiabatic temperature $\Delta T_{EC}$ (expressed in K) measured on a test bench, such as that of FIG. 1, at a measurement temperature gradient of 10° C./min (expressed in ° C.) and under an electric field with a maximum amplitude of: ΔE=60 $MV \cdot m^{-1}$ (7B) and, respectively: ΔE=75 $MV \cdot m^{-1}$ (7C) for the unmodified P(VDF-TrFE-CFE) according to comparative example 2 (bottom curve) and for a modified P(VDF-TrFE-CFE) according to example 8 (top curve).

FIG. 8 represents the relative dielectric permittivity as a function of the measurement temperature of films annealed at 110° C. for 1 hour of the polymers according to examples 1 to 5 and of comparative example 1. The x axis corresponds to the temperature in ° C. and the y axis to the relative dielectric permittivity.

FIG. 9 represents the polarization as a function of the electric field at 25° C. of films annealed at 110° C. for 1 h of the polymers according to examples 1-5 and according to comparative example 1. The x axis corresponds to the electric field in MV/m and the y axis to the polarization in $\mu C/cm^2$.

FIG. 10 represents the relative dielectric permittivity as a function of the temperature of films annealed at 110° C. for 1 h of the polymers according to example 7 and comparative examples 2 and 3. The x axis corresponds to the temperature in ° C. and the y axis to the relative dielectric permittivity.

FIG. 11 represents the polarization as a function of the electric field at 25° C. of films annealed at 110° C. for 1 h of the polymers according to example 8 and according to comparative example 2. The x axis corresponds to the electric field in MV/m and the y axis to the polarization in $pC/cm^Z$.

FIG. 12 represents superimposed infrared spectrograms of the polymer according to example 3 after storage at 110° C. for 1 h, 5 h and 3 d. The x axis corresponds to the wavenumber in $cm^{-1}$ and the y axis to the standardized absorbance.

CHARACTERIZATION OF THE POLYMERS

Measurements of the Electroactive and Electrocaloric Performance Qualities of a Polymer Film With reference to FIG. 1, a polymer film 21 is prepared by blade coating starting from a 100 mg/ml solution in a solvent in which it is soluble. For the polymers tested in the examples below, the solvent used was cyclopentanone.

The solution is prepared at ambient temperature (25° C.) under magnetic stirring for 24 h. Films 21 of 14 μm are deposited on a substrate 22. The substrate 22 is made of PET, has a thickness of 50 μm and was metallized beforehand (10 nm of Cr and 100 nm of Ag). After drying at 90° C. for 2 h, the upper electrodes 23 are evaporated. An annealing is subsequently carried out at 105° C. for 12 h under vacuum. A plate 2 comprising a film of the polymer to be characterized is obtained.

The low-field dielectric data are obtained with a "Solartron SI 1260" device, sold by Solartron Analytical, equipped with the "*Solartron* 1296 *dielectric interface*" interface and with a "*TP*94 *Linkam*" chamber, sold by Linkam Scientific, for the control of the temperature. The measurements are carried out at 1 kHz at different temperatures.

The polarization curves (electric displacement (D) as a function of the electric field (E)) are produced with an "aixACCT TF Analyzer 2000" device, sold by aixACCT Systems, equipped with a "Treck 20/20C—HS" high-voltage amplifier, sold by Treck.

The electrocaloric performance qualities are measured as a function of the temperature and of the applied electric field from a test bench 1 as represented in FIG. 1. The test bench comprises the plate 2, placed on a thermocouple 3, itself placed on a heat sink 4, itself placed on a heating means 5. The thermocouple 3 measures the temperature of the surface of the plate 2 and the variations in temperature of the plate 2. The heat sink 4 under the thermocouple 3 ensures the best possible thermal contact between the heating means 5, the thermocouple 3 and the film 21. The heating means 5 makes it possible to thermostatically control the system at a measurement temperature. A temperature gradient of 10° C./min can be applied.

A square-wave electric field, with a minimum value equal to 0 and a maximum value+ΔE, with a period equal to approximately 90 s, is applied, causing an extremely rapid variation in temperature, the peak of this variation, ΔT, being able to be measured and corresponding to what is denoted by variation in adiabatic temperature in the invention.

Chemical Modification of P(VDF-TrFE-CTFE) Polymers to Create Essentially Nonconjugated C═C Double Bonds 5 g of a P(VDF-TrFE-CTFE) terpolymer having an estimated weight-average molar mass of between 400 000 and 600 000 g/mol, of molar composition 62/30/8, were dissolved in 100 ml of dimethyl sulfoxide (DMSO) in a 250 ml round-bottomed flask. After dissolution, triethylamine (TEA) is added with magnetic stirring. After the reaction, the polymer is purified by precipitation from water, dried under vacuum, dissolved in acetone and precipitated from a 60/40 ethanol/water mixture by weight. The product is dried under vacuum at 40° C. for 12 h.

For the various examples, the reaction parameters (amount of TEA, duration and temperature) are shown in table 1. The number of equivalents of TEA is calculated with respect to the number of —Cl atoms in the terpolymer. The content of double bond DB, expressed in molar percentage, was evaluated from the liquid $^1H$ NMR spectra (see FIG. 3) by integrating the signal according to the following relationship:

[Math 1]

$$DB = \frac{\int_{6ppm}^{6.7ppm}(\text{double bond} - \text{CH})}{\int_{4.7\,ppm}^{5.7\,ppm}(-\text{CHF of } TrFE) + 0.5\cdot\left[\int_{2.2}^{3.7\,ppm}(-\text{CH}_2 \text{ of } VDF)\right] + 2\cdot\left[\int_{6ppm}^{6.7ppm}(\text{double bond} - \text{CH})\right]} \quad \text{(Formula 9)}$$

TABLE 1

| Example | Equivalents of TEA | Duration (h) | Temperature (°C) | DB content (mol %) |
|---|---|---|---|---|
| Comp. Ex. 1 | | | | 0 |
| Ex. 1 | 0.3 | 2 | 20 | 0.6 |
| Ex. 2 | 0.3 | 4 | 40 | 1.9 |
| Ex. 3 | 0.3 | 4 | 50 | 2.2 |
| Ex. 4 | 0.6 | 4 | 40 | 5 |
| Ex. 5 | 0.9 | 4 | 40 | 5.8 |

There is observed, on the Raman spectrum of the samples (see FIG. 4), the appearance of a single signal at 1720 $cm^{-1}$ corresponding to the appearance of a single type of C═C double bond, attributed to the bonds: —CF═CH—, non-conjugated.

Chemical Modification of P(VDF-TrFE-CFE) Polymers to Create C═C Double Bonds 5 g of a P(VDF-TrFE-CFE) terpolymer having an estimated weight-average molar mass of between 400 000 and 600 000 g/mol, of molar composition 66/27/7, are dissolved in 100 ml of DMSO in a 250 ml round-bottomed flask. After dissolution, triethylamine (TEA) is added with magnetic stirring. After the reaction, the polymer is purified by precipitation in water, dried under vacuum, dissolved in acetone and precipitated in a 60/40 ethanol/water mass mixture.

The product is dried under vacuum at 40° C. for 12 h.

The different reaction parameters (amount of TEA, duration and temperature) are shown in table 2. The number of equivalents of TEA is calculated with respect to the number of —CI atoms in the terpolymer. The double bond number is calculated as already explained from the liquid $^1H$ NMR spectra.

TABLE 2

| | Equivalents of TEA | Duration | Temperature | DB content |
|---|---|---|---|---|
| Comp. Ex. 2 | | | | 0 |
| Example 6 | 0.1 | 4 h | 40 °C | 0.1 mol % |
| Example 7 | 0.2 | 4 h | 40 °C | 0.1 mol % |

TABLE 2-continued

| | Equivalents of TEA | Duration | Temperature | DB content |
|---|---|---|---|---|
| Example 8 | 0.35 | 8 h | 40 °C | 0.2 mol % |
| Comp. Ex. 3 | 0.65 | 24 h | 40 °C | 2.5 mol % |

There is observed, on the Raman spectrum of the samples (see FIG. 5), the appearance of multiple signals between 1750 and 1500 $cm^{-1}$. The vibration band at 1552 $cm^{-1}$ increases very intensely for the polymer with the highest degree of modification (Comp. Ex. 3), indicating the presence of conjugated double bonds. The presence of conjugated double bonds is confirmed by the brown coloration of the most modified product (initially white or slightly yellowed).

Electrocaloric Properties of the Samples

With reference to FIG. 6, a marked improvement in the electrocaloric properties, in particular in the value of variation in adiabatic temperature at a given measurement temperature and under an electric field of given maximum amplitude, of the polymers comprising nonconjugated double bonds according to the invention (Ex. 4) is noticed, in comparison with the polymer of similar structure but not comprising a double bond (Comp. Ex. 1). A maximum of $\Delta T_{EC}$(MAX) of approximately 2.6 K was determined at a temperature of approximately 35° C. $\Delta T_{EC}$ is equal to at least 0.85*$\Delta T_{EC}$(MAX) over an interval of several tens of degrees Celsius, between approximately 28° C. and 50° C.

With reference to FIGS. 7A, 7B and 7C, it is noticed that the electrocaloric properties, in particular the value of variation in adiabatic temperature at a given measurement temperature and under an electric field of given maximum amplitude, of the polymers comprising nonconjugated double bonds according to the invention (Ex. 7) are better than those of a polymer of similar structure but comprising conjugated double bonds (Comp. Ex. 1). In particular, with reference to FIGS. 7B and 7C, the $\Delta T_{EC}$ values vary little over the interval of measurement temperatures: a variation of less than 20% is observed for measurement temperatures ranging from 25° C. to 50° C.

Dielectric Properties

With reference to FIGS. 8 and 10, it is noticed that the polymers having nonconjugated double bonds according to the invention have a higher dielectric constant (examples 1-5; 6-7) than those of a polymer of similar structure but not comprising a double bond (Comp. Ex. 1; Comp. Ex. 2) or comprising conjugated double bonds (Comp. Ex. 3).

In addition, a relative permittivity maximum is observed for the polymer according to example 4, in comparison with the polymers according to examples 1-3 and 5.

Polarization

With reference to FIGS. 9 and 11, the polymers having nonconjugated double bonds according to the invention (examples 1-4; 6-7) are relaxor ferroelectric polymers.

It is additionally noticed that the increase in the proportion of double bonds leads to an increase in the remanent polarization and in the coercive field.

Melting

The melting point and the enthalpy of fusion were measured according to the standard ISO 11357-3:2018, in second heating, with a heating gradient of 10° C./min.

TABLE 3

| | Melting Temperature (°C) | Enthalpy (J/g) |
|---|---|---|
| Comp. Ex. 1 | 123 | 17 |
| Ex. 1 | 125 | 19 |
| Ex. 2 | 126 | 17 |
| Ex. 3 | 126 | 20 |
| Ex. 4 | 121 | 17 |
| Ex. 5 | 121 | 17 |
| Comp. Ex. 2 | 129 | 22 |
| Ex. 6 | 132 | 24 |
| Ex. 7 | 131 | 21 |
| Ex. 8 | 131 | 21 |
| Comp. Ex. 3 | 130 | 17 |

Thermal Stability

With reference to FIG. 12, the valence vibration band at 1700 $cm^{-1}$ for the polymer according to example 3, corresponding to the carbon-carbon double bonds, is still present after 3 days of storage at 110° C., indicating good thermal stability of the polymer.

The invention claimed is:

1. A polymer exhibiting an electrocaloric effect under the effect of a variable electric field, the polymer comprising:

from 30 mol % to 90 mol % of unit of formula: —($CF_2$—$CH_2$)— (III), from 1 mol % to 59.9 mol % of at least one unit of formula: —(CX1X2-CX3X4)- (IV), from 0 mol % to (20-N) mol % of at least one unit of formula: —(CY1Y2-CY3Z)— (V), and N mol % of ethylenic unit(s) chosen from the list consisting of: —(CY3═CF)—, —(CY3═CX1)-, —(CY3=CX2)-, —(CY1═CY3)-, —(CY2═CY3)- and their mixture;

in which:

X1 and X2 independently denote: —H, —F or alkyl groups comprising from 1 to 3 carbon atoms which are optionally partially or completely fluorinated, X3 and X4 independently denote: —F or alkyl groups comprising from 1 to 3 carbon atoms which are optionally partially or completely fluorinated, except for the combination where:

X1 and X2 are both: —H and X3 and X4 are both: —F,

Y1 and Y2 independently denote: —H, —F, —Cl or alkyl groups comprising from 1 to 3 carbon atoms which are optionally partially or completely fluorinated, Y3 denotes: —F, —Cl or alkyl groups comprising from 1 to 3 carbon atoms which are optionally partially or completely fluorinated, Z denotes a halogen atom other than: —F, N is a number ranging from 0.1 to 10.0; and wherein the ethylenic units are non-conjugated carbon-carbon double bonds, and wherein the polymer comprises 0.1 to 10 mol % of said ethylenic units present in the polymer backbone, the polymer exhibiting a proportion of conjugated carbon-carbon double bonds, with respect to the total number of carbon-carbon double bonds, of less than or equal to 10%.

2. The polymer as claimed in claim 1, in which X1 denotes: —H or —F; and X2, X3 and X4 denote, each three: —F.

3. The polymer as claimed in claim 1, in which Z denotes: —Cl.

4. The polymer as claimed in claim 1, in which $Y_3$ denotes: —F, and $Y_1$ and $Y_2$ both denote: —H or —F.

5. The polymer as claimed in claim 1, the polymer comprising at least 1 mol % of unit of formula (V).

6. The polymer as claimed in claim 1, the polymer being relaxor ferroelectric.

7. The polymer as claimed in claim 1, the polymer having a remanent polarization of less than or equal to 20 mC/m2 and/or a coercive field of less than or equal to 25 V/μm, the remanent polarization and coercive field measurements both being carried out at 25° C., at a frequency of 1 Hz and at a field of 150 V/μm.

8. The polymer as claimed in claim 1, having a weight-average molecular weight of greater than or equal to 200,000 g/mol.

9. The polymer as claimed in claim 1, having an enthalpy of fusion of greater than or equal to 10 J/g, p the enthalpy of fusion being measured according to the standard ISO 11357-2: 2013, in second heating with temperature gradients of 10° C./min.

10. The polymer as claimed in claim 1, having a relative dielectric permittivity of greater than or equal to 15, over a range of temperatures of at least 5° C.; the relative dielectric permittivity being measured at 1 kHz.

11. The polymer as claimed in claim 1, having a permittivity maximum at a temperature of less than or equal to 60° C.;

the relative dielectric permittivity being measured at 1 kHz.

12. The polymer as claimed in claim 1, the polymer being capable of being obtained by a process comprising:

a) providing an initial polymer comprising, in total moles of polymer:

from 40 mol % to 90 mol % of unit of formula: —(CF2-CH2)- (III), from 9.9 mol % to 59.9 mol % of at least one unit of formula: —(CX1X2-CX3X4)- (IV), from 0.1 mol % to 20 mol % of at least one unit of formula: —(CY1$Y_2$—CY3Z)— (V);

and b) dehydrohalogenation of the initial polymer, the dehydrohalogenation consisting essentially of the elimination, at least partially, of: —Z and of an adjacent hydrogen.

13. The polymer as claimed in claim 12, having a variation in adiabatic temperature which is at least greater by 0.5° C., with respect to the variation in adiabatic temperature of the initial polymer, at at least one measurement temperature, the measurements of variations in adiabatic temperatures being carried out at a variable electric field having a maximum amplitude equal to 86 V/μm.

14. The polymer as claimed in claim 12, having a relative dielectric permittivity maximum which is at least greater by 5%, with respect to the dielectric permittivity maximum of the initial polymer;

the relative dielectric permittivity being measured at 1 kHz.

15. The polymer as claimed in claim 12, in which the dehydrohalogenation is carried out with a reaction progress of at least 0.1.

16. A composition comprising: at least one polymer as claimed in claim 1, and at least one liquid vehicle for the polymer.

17. A film comprising the polymer as claimed in claim 1.

18. The film as claimed in claim 17, having a thickness of greater than or equal to 0.1 micrometer.

19. The polymer as claimed in claim 1, in which X1 denotes: —H; X2, X3 and X4 denote, each three: —F; $Y_3$ denotes: —F; $Y_1$ and $Y_2$ both denote: —H; and Z denotes —Cl;

in which N is chosen between 0.1 and 2.

20. The polymer as claimed in claim 1, in which X1 denotes: —H; X2, X3 and X4 denote, all three: —F; $Y_1$, $Y_2$ and $Y_3$ denote, each three: —F; and Z denotes: —Cl;

in which N is chosen between 0.1 and 10.0.

21. The polymer as claimed in claim 1, wherein the polymer exhibiting a proportion of conjugated carbon-carbon double bonds, with respect to the total number of carbon-carbon double bonds, of less than or equal to 1%.

22. A heat transfer system comprising a polymer as claimed in claim 1.

23. An energy storage system comprising a polymer as claimed in claim 19.

* * * * *